(12) United States Patent
Kim

(10) Patent No.: US 10,375,224 B2
(45) Date of Patent: *Aug. 6, 2019

(54) SYSTEM, A COMPUTER READABLE MEDIUM, AND A METHOD FOR PROVIDING AN INTEGRATED MANAGEMENT OF MESSAGE INFORMATION

(71) Applicant: NHN Entertainment Corporation, Seongnam-si (KR)

(72) Inventor: Dong Wook Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,696

(22) Filed: Mar. 28, 2018

(65) Prior Publication Data

US 2018/0288211 A1    Oct. 4, 2018

(30) Foreign Application Priority Data

Mar. 30, 2017 (KR) .......................... 10-2017-0040405

(51) Int. Cl.
*H04M 1/725* (2006.01)
*H04L 12/58* (2006.01)
(Continued)

(52) U.S. Cl.
CPC .... *H04M 1/72552* (2013.01); *G06F 17/2785* (2013.01); *G06Q 10/1093* (2013.01);
(Continued)

(58) Field of Classification Search
CPC ........... G06F 17/30752; G06F 17/2785; H04L 51/046; H04L 51/08; H04L 67/22;
(Continued)

(56) References Cited

U.S. PATENT DOCUMENTS

2004/0167779 A1* 8/2004 Lucke ................... G10L 15/187
                                                                704/240
2012/0253788 A1* 10/2012 Heck ..................... G06F 17/279
                                                                704/9

(Continued)

*Primary Examiner* — Daniel Lai
(74) *Attorney, Agent, or Firm* — H.C. Park & Associates, PLC

(57) ABSTRACT

A mobile device providing integrated management of message information and service provision through artificial intelligence is disclosed. The mobile device includes an integrated message management unit comprising a message monitoring unit configured to monitor voice call information and text message information in association with the voice call management part and the text message management part, a message information managing unit configured to generate integrated message information, which is to be provided to a user, based on the voice call information and the text message information, an interface managing unit configured to generate an integrated message management user interface displaying the integrated message information, and an artificial intelligence agent analyzing the voice call information and the text message information and providing a service associated with at least one additional function in association with the additional function process part based on the analyzed result.

19 Claims, 21 Drawing Sheets

(51) Int. Cl.
*H04W 4/12* (2009.01)
*H04W 4/02* (2018.01)
*G10L 15/02* (2006.01)
*G06F 17/27* (2006.01)
*G06Q 10/10* (2012.01)

(52) U.S. Cl.
CPC .............. *G10L 15/02* (2013.01); *H04L 51/02* (2013.01); *H04L 51/046* (2013.01); *H04L 51/16* (2013.01); *H04W 4/023* (2013.01); *H04W 4/12* (2013.01); *G10L 2015/025* (2013.01); *H04M 1/72597* (2013.01); *H04M 2250/74* (2013.01)

(58) Field of Classification Search
CPC ......... H04L 51/10; H04L 51/18; H04L 51/20; H04L 67/1095; H04L 51/36; H04L 51/02; H04L 51/16; H04M 1/72552; H04M 2203/651; H04M 3/42382; H04M 7/0042; H04M 2250/74; H04M 1/72597; G06Q 10/109; G06Q 10/1095; G06Q 10/06311; G06Q 10/1093; H04W 4/12; H04W 4/14; H04W 4/02; H04W 4/025; H04W 4/023; G10L 2015/025; G10L 15/02
See application file for complete search history.

(56) References Cited

U.S. PATENT DOCUMENTS

| | | | |
|---|---|---|---|
| 2014/0229560 A1* | 8/2014 | Gray | G06Q 10/1095 709/206 |
| 2015/0134646 A1* | 5/2015 | Dave | H04W 4/21 707/722 |
| 2016/0174074 A1* | 6/2016 | Kim | H04W 12/06 455/411 |
| 2016/0203819 A1* | 7/2016 | Ma | G10L 15/26 704/235 |
| 2016/0205049 A1* | 7/2016 | Kim | H04L 51/046 455/414.1 |
| 2017/0132019 A1* | 5/2017 | Karashchuk | H04W 4/12 |
| 2017/0222961 A1* | 8/2017 | Beach | H04L 51/16 |
| 2018/0159805 A1* | 6/2018 | Jones | H04L 51/046 |
| 2018/0227424 A1* | 8/2018 | Dorsey | H04M 3/533 |

* cited by examiner

SYSTEM, A COMPUTER READABLE MEDIUM, AND A METHOD FOR PROVIDING AN INTEGRATED MANAGEMENT OF MESSAGE INFORMATION

CROSS REFERENCE TO RELATED APPLICATION

This application claims priority from and the benefit of Korean Patent Application No. 10-2017-0040405, filed on Mar. 30, 2017, which is hereby incorporated by reference for all purposes as if fully set forth herein.

BACKGROUND

Field

Exemplary embodiments of the invention relate generally to an apparatus and method for managing information on voice calls and text messages exchanged through a mobile telephone switching network, and more specifically, to an apparatus and a method for providing an integrated message management service that manages information on a voice call and a text message.

Discussion of the Background

A mobile telephone system supports voice calls and the exchange of text messages between mobile terminals. Recently, smartphones have sent and received voice calls and text messages through the mobile phone switching network. A smartphone generally has a voice call management application for controlling the voice call function and managing voice call information, such as the time of receiving and sending a voice call, the counterpart (i.e., caller) information (phone number or contact name) of the voice call, total call duration, etc. The user can execute the voice call management application to inquire the voice call history and the detailed information of the voice call, and delete the inquired voice call information. On the other hand, a smartphone generally also has a text message management application that controls a text message function and stores information, for example, the time for receiving and sending a text message, the counterpart (i.e., person texting) information (phone number or contact name) of the text message, contents of the text message, etc. The user can execute the text message management application to inquire the text message history and the detailed information of the text message, and delete the inquired text message information.

However, since the voice call application and the text message application in a conventional smartphone are executed independently, the voice call information and the text message information cannot be managed at once. In addition, the conventional voice call application and the text message application do not provide any additional functions other than its functions of receiving/transmitting a voice call/text message and managing voice call/text message information. Therefore, even when a user desires other additional functions in association with voice calls and text messages sent and received by the user, it may be difficult to immediately execute the additional functions.

The above information disclosed in this Background section is only for understanding of the background of the inventive concepts, and, therefore, it may contain information that does not constitute prior art.

SUMMARY

Exemplary embodiments of the present invention provide a method and a mobile device for providing a user interface for managing voice call information and text message information.

Additional features of the inventive concepts will be set forth in the description which follows, and in part will be apparent from the description, or may be learned by practice of the inventive concepts.

An exemplary embodiment provides a mobile communication device comprising a voice call management part configured to manage a voice call, a text message management part configured to manage text messages exchanged through a mobile telephone switching network, a display part, an integrated message management unit, and an additional function process part configured to process at least one additional function in association with the integrated message management unit. The integrated message management unit may comprise a message monitoring unit configured to monitor voice call information and text message information in association with the voice call management part and the text message management part, a message information managing unit configured to generate integrated message information, which is to be provided to a user, based on the voice call information and the text message information, an interface managing unit configured to generate an integrated message management user interface displaying the integrated message information, and an artificial intelligence agent analyzing the voice call information and the text message information and providing a service associated with at least one additional function in association with the additional function processing unit based on the analyzed result.

Another exemplary embodiment provides a method, performed by an artificial agent of a mobile device, for creating a schedule based on analysis of incoming and outgoing message, the method comprises performing morpheme analysis and speech act analysis on a first message transmitted or received by the mobile device, determining whether the first message is a message for arranging a schedule, extracting entities constituting a schedule from the first message to generate schedule information and temporarily storing the schedule information, determining whether the first message is a notification of a fixed schedule using the result of the morpheme analysis and speech act analysis, and registering the schedule information when the first message is determined as a notification of a fixed schedule.

The foregoing general description and the following detailed description are exemplary and explanatory and are intended to provide further explanation of the claimed subject matter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
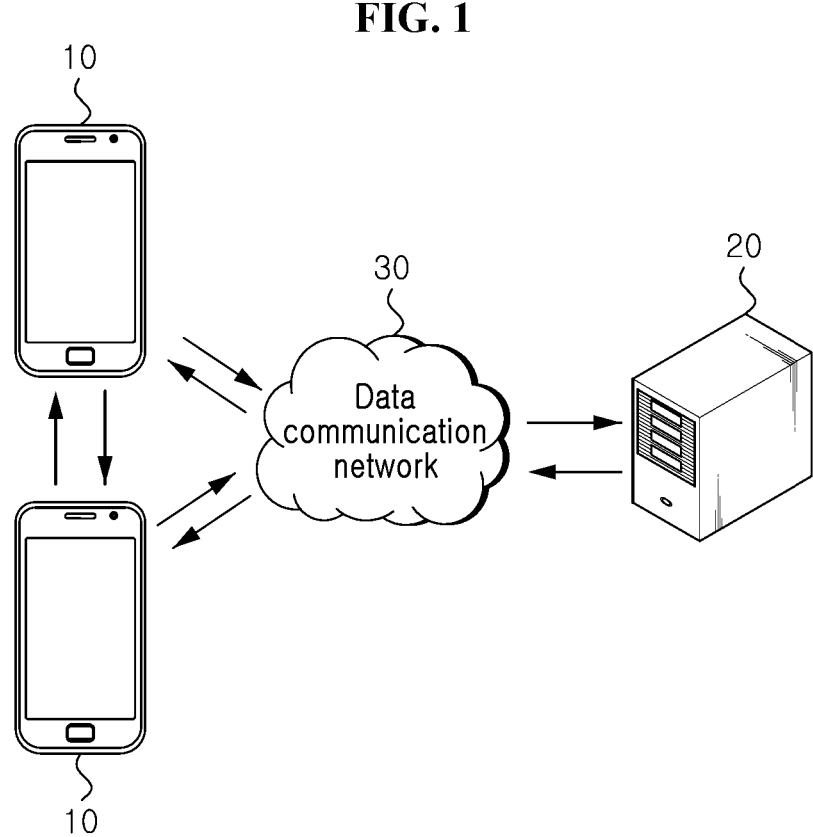
FIG. 1 is a block diagram illustrating a configuration of an integrated message management service system according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, one or more components thereof, including components described as a "part", may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the parts, features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, one or more components thereof may include or otherwise be associated with one or more memories (not shown) including code (e.g., instructions) configured to cause information management, and/or one or more components thereof to perform one or more of the parts, features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating a configuration of an integrated message management service system according to an exemplary embodiment of the present invention.

The integrated management service system according to an exemplary embodiment may include a plurality of mobile terminals 10, an integrated message management service server 20, and data communication network 30. The mobile terminals 10 and the integrated message management service server 20 may be in communication with each other to transmit signals or data for providing an integrated message information management service via the data communication network 30. The mobile terminal 10 may be a telecommunication device that may transmit and receive a voice call and a text message via a communication network, and exchange data via wireless communication network. The mobile terminal 10 may include a display device configured to display various graphical user interfaces.

An integrated message management service system according to an exemplary embodiment of the present invention may have various system configurations. Hereinafter, an integrated message information management system and an integrated message information management service provided by the system will be described with reference to exemplary embodiments of the present invention.

Figure 2:
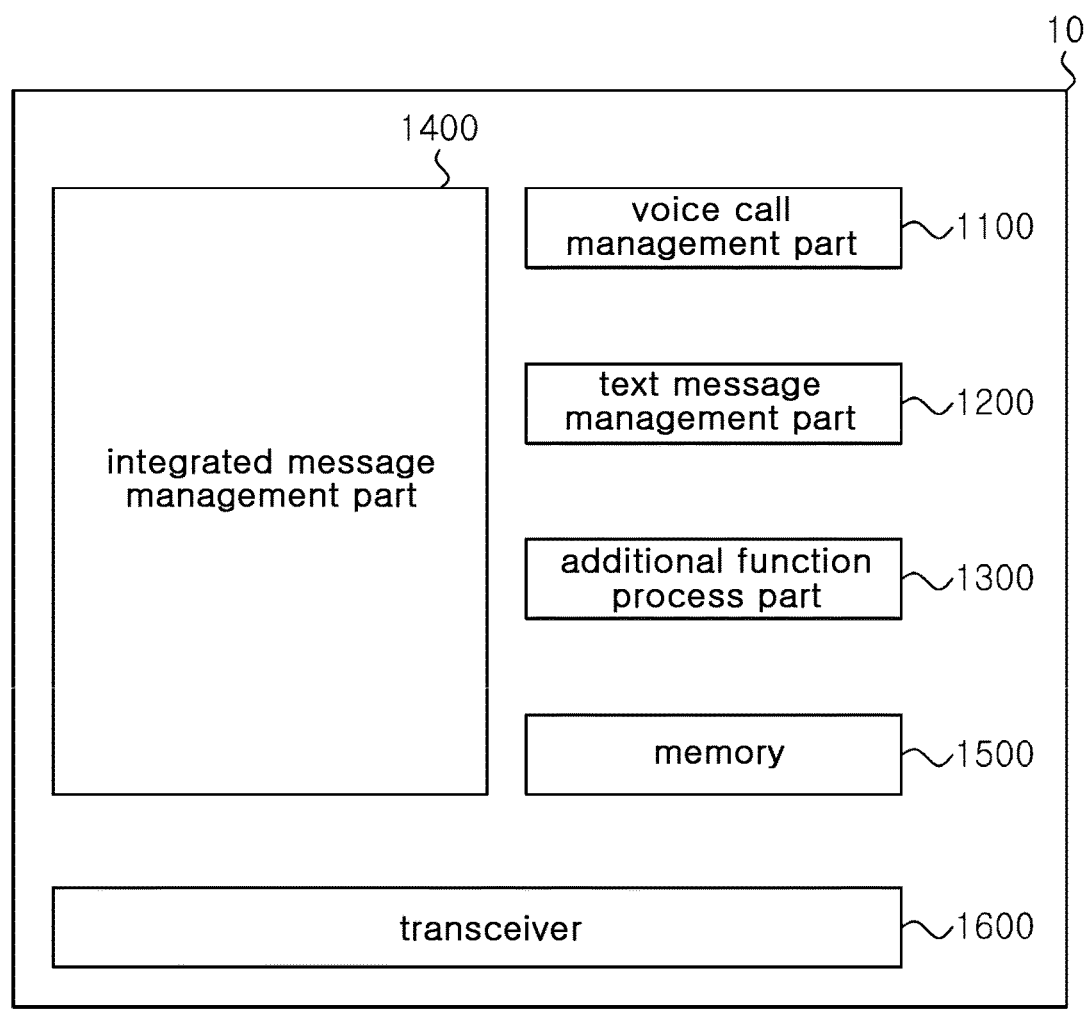
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

The mobile terminal 10 according to an exemplary embodiment of the present invention includes a voice call management part 1100, a text message management part 1200, an additional function process part 1300, an integrated message management part 1400, a memory 1500, and a transceiver 1600. Additional input/output elements may also be included in terminal 10, including but not limited to a speaker, microphone, switch, touch sensor, keyboard, trackball, pen, camera, LED light, etc.

The voice call management part 1100 may be software, hardware, or a combination of hardware and software, each of which is configured to process a voice call exchanged through the mobile-phone switching network, and to manage information on the voice call (hereinafter, referred to as "voice call information"). The voice call information may include, for example, a receiving and transmitting time of a voice call, a counterpart (phone number or contact name) information of a voice call, a total call time, success or failure of the voice call connection, and the like. The voice call management part 1100 collects the voice call information on all of the voice calls received or transmitted by the mobile terminal 10 and stores the voice call information. The management of the voice call information may be performed in conjunction with an address book management application installed in the mobile terminal 10. For example, if caller identification (CID) is included in the incoming voice call, the received CID is compared with the phone numbers stored in the address book. If the same number is stored in the address book, the voice call information management part 1100 retrieves the contact name of the CID and records it in the voice call information. Otherwise, the phone number (CID) is recorded in the voice call information.

The text message management part 1200 may be software, hardware, or a combination of hardware and software, which is configured to transmit/receive a text message exchanged through a mobile telephone switching network, such as a Short Message Service (SMS) and a Multimedia Messaging Service (MMS), and to manage information about a text message (hereinafter, "text message information"). The text message information managed by the text message management part 1200 may include, for example, a receiving and transmitting time, a receiver/sender (phone number), content of the text message, and the like. In addition, management of the text message information may be performed in cooperation with an address book application installed in the mobile terminal 10. For example, if there is caller identification (CID) included in the received text message, the received CID is compared with the phone numbers stored in the address book. If the same number is stored in the address book, the text message management part 1200 retrieves a contact name having the CID and records the contact name in the text message information. Otherwise, the phone number (CID) is recorded in the text message information.

The transceiver 1600 performs a function of receiving and transmitting a voice call and a text message through the mobile telephone switching network. The transceiver 1600 typically may also function to receive and transmit signals related to packet data communication, other than voice communication and text messages, through a wireless data communication network.

The additional function process part 1300 may be hardware, software, or a combination of hardware and software configured to provide various additional functions. For example, the additional function process part 1300 may be a combination of software including instructions necessary for performing the additional functions, and a processor performing processes according to the instructions. At this time, the software, as a part of the additional function process part 1300, may be installed in the mobile terminal 10 in a form of an application. The additional function process part 1300 may be configured to perform one or more functions. Hereinafter, the operation of the additional function process part 1300 will be described for each function.

The mobile terminal 10 according to an exemplary embodiment of the present invention may include a schedule information management application, as an exemplary part of the additional function process part 1300. The schedule information management application is configured to manage schedule information of the user. The schedule information management application may provide a schedule management user interface through which a user creates, modifies, and deletes his or her schedule. The schedule information input through the schedule management user interface may include, for example, a scheduled date and time, a place, a scheduled entry, and the like. The schedule information is stored in a memory 1500.

The mobile terminal 10 according to an exemplary embodiment of the present invention may include a memo application as an example of the additional function process part 1300. The memo application provides a memo user interface for creating, modifying, deleting, and viewing a memo, and stores the created memo in the memory 1500 of the mobile terminal 10.

The mobile terminal 10 according to an exemplary embodiment of the present invention may include a social network service (SNS) application as an example of the additional function process part 1300. An SNS application is used to share a variety of content over a data network for social relationships among multiple users.

The above-mentioned additional functions may be provided by an additional function process part 1300 embedded in the integrated message management part 1400.

The integrated message management part 1400 manages voice call information and text message information in association with the voice call management part 1100 and the text message management part 1200, and provides an additional function in association with the additional function process part 1300 (e.g., a schedule information management application, a memo managing unit, and an SNS application).

Figure 3:
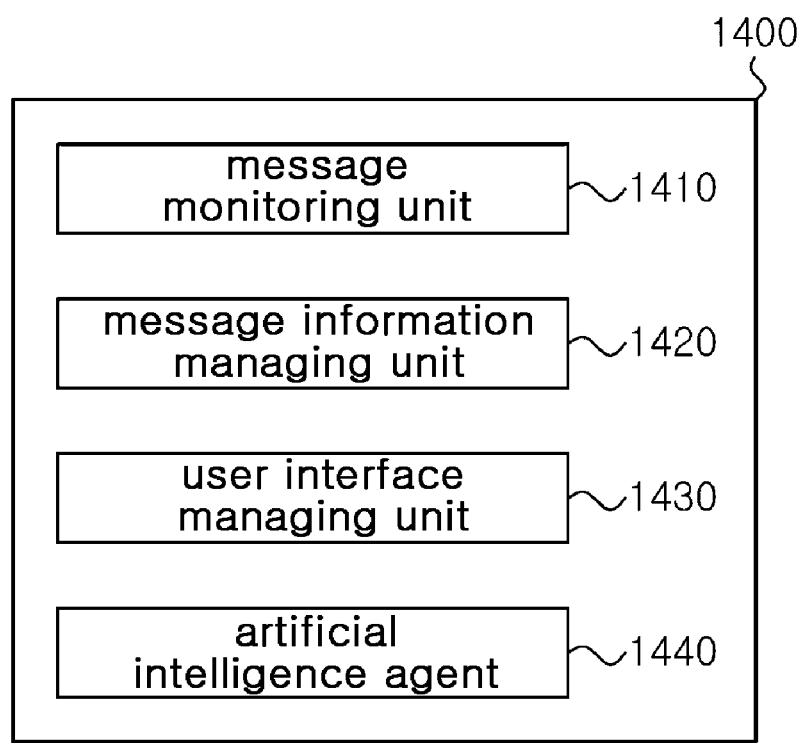
FIG. 3 is a detailed block diagram illustrating a mobile terminal according to an exemplary embodiment of the present invention.

FIG. 3 is a detailed block diagram illustrating a mobile terminal according to an exemplary embodiment of the present invention.

Referring to FIG. 3, the integrated message management part 1400 includes a message monitoring unit 1410, a message information managing unit 1420, a user interface managing unit 1430, and an artificial intelligence agent (AI agent) 1440, each of which may be software, hardware, or a combination of hardware and software configured to perform its respective function.

The message monitoring unit 1410 monitors, in association with the voice call management part 1100 and the text message management part 1200, updates of information on voice calls and/or text messages received or transmitted by the mobile terminal 10.

When the mobile terminal 10 receives a voice call, the voice call management part 1100 stores information on the incoming voice call, such as counterpart (phone number or contact name) information and a receiving time of the incoming voice call, in the memory 1500 of the mobile terminal 10. In addition, when the user of the mobile terminal 10 has actually answered the incoming voice call, the total conversation time and/or the call termination time may be recorded in the memory 1500. On the other hand, if the user of the mobile terminal 10 does not respond to the incoming voice call, that is, if a voice call connection fails, the voice call connection failure may be recorded in the memory 1500. As such, the voice call management part 1100 stores the information on the incoming voice call in the memory 1500 every time a voice call is received.

The message monitoring unit 1410 accesses the memory 1500 to look up voice call information stored therein. The message monitoring unit 1410 monitors whether the incoming voice call information is updated in various manners. For example, the message monitoring unit 1410 may be configured to periodically access the memory 1500 to monitor whether new incoming voice call information is updated. Alternatively, the message monitoring unit 1410 may be configured to monitor updates of incoming voice call information in real-time. Still alternatively, the message monitoring unit 1410 may be configured to access to the memory 1500 to monitor an update of incoming voice call information only upon activation of the integrated message management part 1400.

The above-described monitoring update of incoming voice call information performed by the message monitoring unit 1410 may also be performed for outgoing voice call. In particular, the message monitoring unit 1410 monitors updates of information on outgoing voice calls originating from the user through the mobile terminal 10 in substantially the same manner as described above for the incoming voice call information.

Monitoring of updates of information on text messages, performed by the message monitoring unit 1410, is described in detail below.

When a text message is received by the user's mobile terminal 10, the text message management part 1200 stores information on incoming text message in the memory 1500 of the mobile terminal 10. The incoming text message information may include, for example, a sender, a receiving time, content of the message, and the like. The message monitoring unit 1410 may access the memory 1500 to monitor an update of incoming text message information. The message monitoring unit 1410 can monitor whether the received text message information is updated in various manners. For example, the message monitoring unit 1410 may be configured to periodically access the memory 1500 to monitor whether new incoming text message information is updated. Alternatively, the message monitoring unit 1410 may be configured to detect an update of incoming text message information in real-time. Still alternatively, the message monitoring unit 1410 may be configured to access the memory 1500 to monitor an update of incoming text message information only upon activation of the integrated message management part 1400.

The above-described monitoring update of incoming text message information performed by the message monitoring unit 1410 may also be performed for outgoing text message. In particular, the message monitoring unit 1410 monitors updates of information on outgoing text messages transmitted from the user through the mobile terminal 10 in substantially the same manner as described above for the incoming text message information.

The message information managing unit 1420 is configured to retrieve the updated voice call information and updated text message information detected by the message monitoring unit 1410, and to generate integrated message information which will be provided for the user through an integrated message management user interface 100. For example, when the message monitoring unit 1410 detects a new incoming voice call, the message information managing unit 1420 retrieves the incoming voice call information, and generates integrated message information based on the retrieved incoming voice call information. The generated integrated message information may be stored in the memory 1500.

The above described operation of the integrated message information managing unit 1420 may be performed in synchronization with the message monitoring operation of the message monitoring unit 1410.

On the other hand, the message information managing unit 1420 may be configured to operate asynchronously with the operation of the message monitoring unit 1410. More particularly, regardless of configuration of message monitoring operation, the message information managing unit 1420 may be configured to retrieve the update of the voice call information and the text message information at a different time period than the monitoring period, or may be configured to operate only when integrated message information management application is activated.

On the other hand, the message information managing unit 1420 is configured to access the memory 1500 to read information about update of the message inquired by the message monitoring unit 1410, and to generate the integrated message information based on the information.

The user interface managing unit 1430 generates and displays an integrated message management user interface, receives various user inputs through the integrated message management user interface, and performs processes corresponding to the user input. More specifically, the user interface managing unit 1430, in response to a user input, generates a first message management user interface and displays it on a screen of the mobile terminal 10. In addition, the user interface managing unit 1430, in response to a user input, may generate a second message management user interface and displays it on a screen of the mobile terminal 10. In addition, the user interface managing unit 1430 may access the additional function process part 1300 to process an additional function in association with the first and second message management user interfaces, and display the processed results on the first and second message management user interface.

The integrated message management part 1400 may be hardware, software, or a combination of hardware and software configured to perform the above-described processes. For example, the integrated message management part 1400 may be a combination of software including instructions necessary to perform the above-described message monitoring/message managing user interface managing functions, and a processor performing processes corresponding to the instructions. In this case, the software which is a part of the integrated message management part 1400 may be installed in the mobile terminal 10 in the form of an application. The message monitoring unit 1410, the message information managing unit 1420, and the user interface managing unit 1430 may be independent software and hardware, respectively. On the other hand, each function of the integrated message management part 1400 may be performed in a form of distributed process.

The operation of the integrated message management part 1400 according an exemplary embodiment of the present invention will be described in more detail.

First, the process of generating the first message management user interface by the user interface managing unit 1430 will be described in detail with reference to FIG. 4 and FIG. 5.

Figure 4:
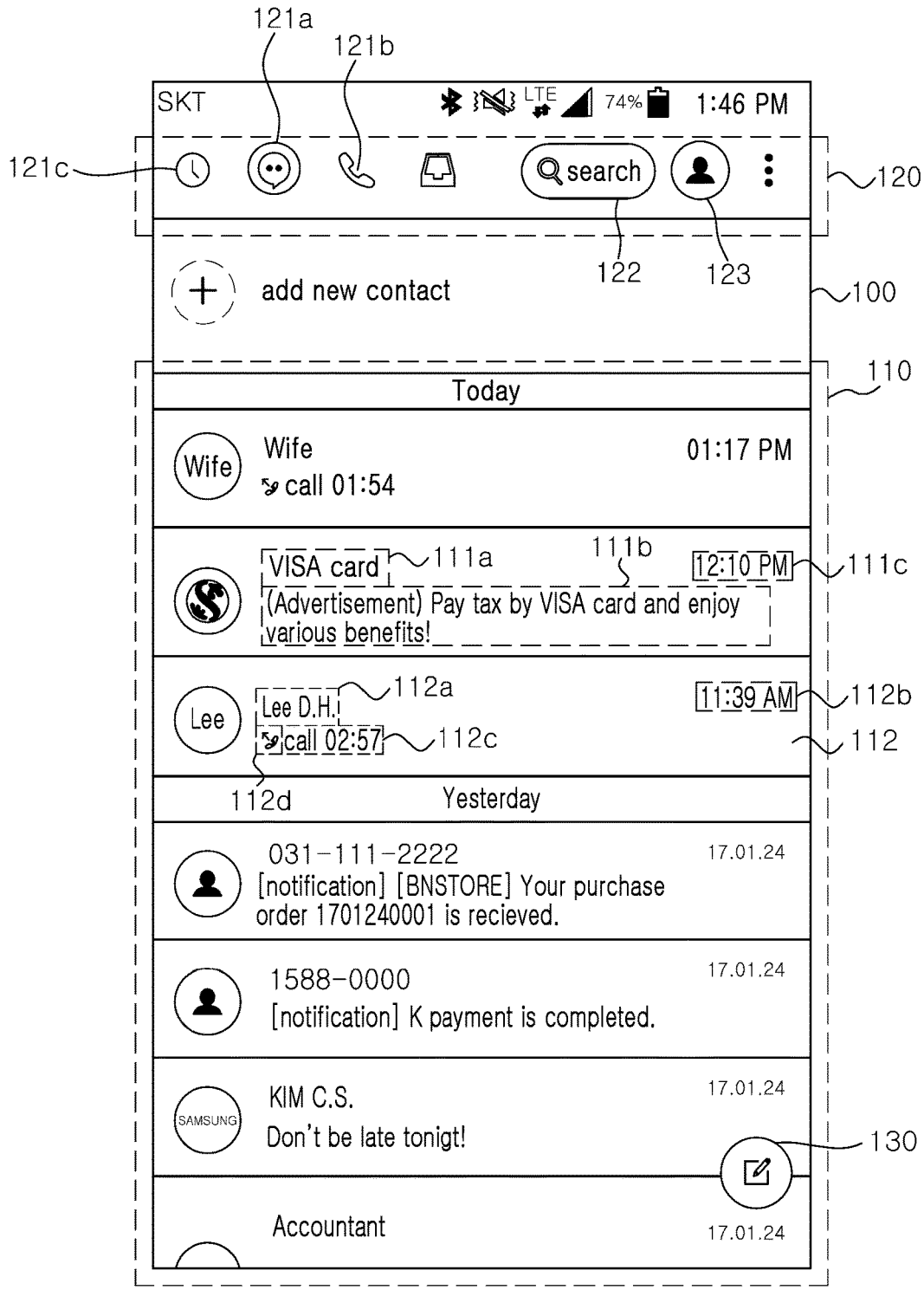
FIG. 4 is a screenshot illustrating an example of a first message management user interface displayed on a mobile terminal.

FIG. 4 is a screenshot illustrating an example of a first message management user interface displayed on a mobile terminal.

Referring to FIG. 4, a first message management user interface 100 according to an exemplary embodiment includes a message information display area 110 and a menu bar 120. The message information display area 110 includes a plurality of message blocks 111 and 112. Each of the message blocks 111 and 112 includes integrated message information corresponding to a voice call or a text message. The integrated message information is information generated from voice call information or text message information stored in the memory 1500, and may include all or part of the entries included in the voice call information and the text message information.

For example, the message block 111 and 112 display recipient or sender information. The recipient or sender information may be provided with reference to the address book. In addition, the message blocks 111 and 112 may include an incoming/outgoing indicator indicating whether a message was received or sent. For example, whether a voice call and a text message are received or transmitted may be indicated by direction of an arrow. The integrated message information may also include a message type indicator indicating whether the message is a voice call or a text message. Referring to FIG. 4, a message block 111 for a text message includes a counterpart 111a of the text message, a content 111b of a text message, a receiving/sending time 111c. On the other hand, in the message block 112 for a voice call includes a counterpart 112a, the receiving/sending time 112b, the total call time 112c, and receiving/sending indicator 112d.

The user interface managing unit 1430 may sort the message blocks 111 and 112 in the order of time. For example, the message blocks 111 and 112 may be arranged in descending order according to the receiving/transmitting time. Accordingly, message blocks 111 and 112 of the most recently received or transmitted message are displayed at the top of the message information display area 110.

Figure 5:
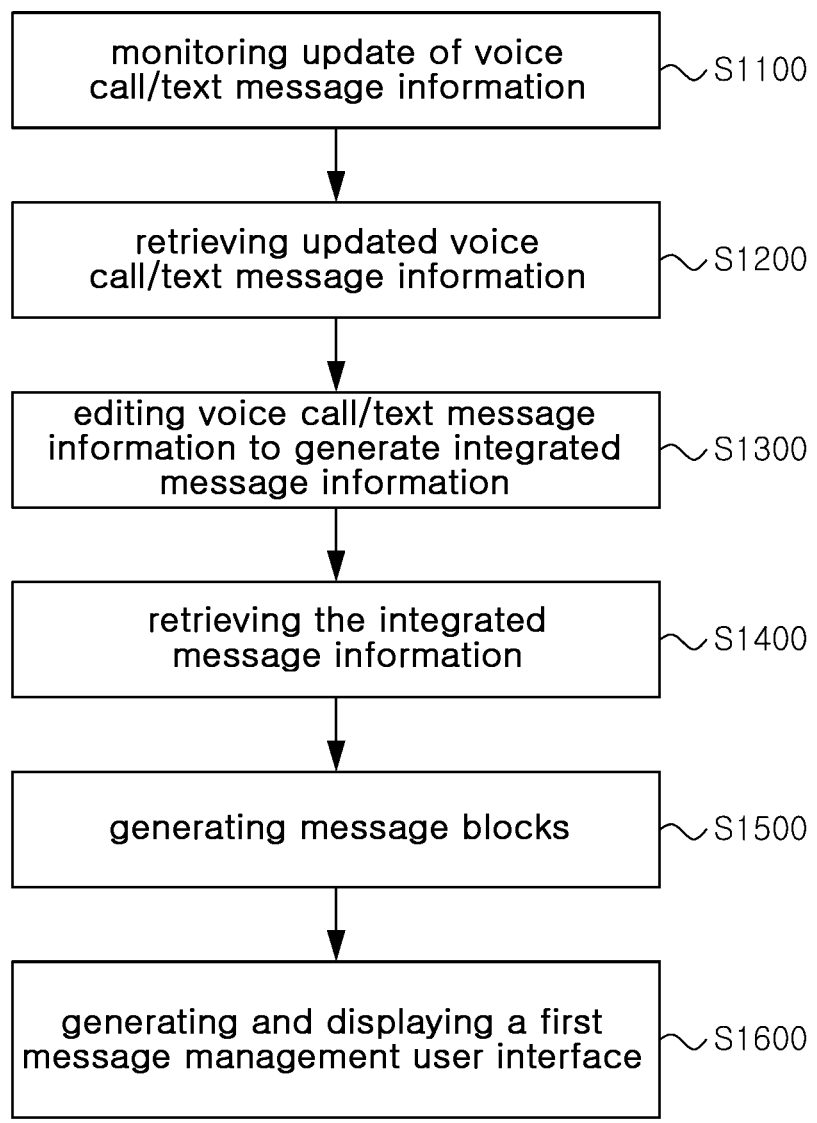
FIG. 5 is a flowchart illustrating a process for generating a first message management user interface having the configuration shown in FIG. 4.

FIG. 5 is a flowchart illustrating a process of generating a first message management user interface having the configuration shown of FIG. 4.

Referring to FIGS. 4 and 5, in step S1100, the message monitoring unit 1410 monitors whether voice call information/text message information is updated in association with the voice call management part 1100 and text message management part 1200.

When the message monitoring unit 1410 detects that voice call information or text message information is updated (e.g., new voice call and/or text message is received or transmitted), in step S1200, the message information managing unit 1420 retrieves the updated voice call information and/or text message information. In step S1300, the message information managing unit 1420 edits the call information and/or text message information according to a message block format to generate the integrated message information.

The message block format may define the entries of the message information to be included in the message blocks 111 and 112. The message block format may be set by the user or the integrated message management service server 20. Referring back to FIG. 4, the text message block 111 includes a recipient/sender (counterpart) contact 111a, receiving/transmitting time 111c, and message body 111b. In addition, the voice call block 112 includes the recipient/sender (counterpart) contact 112a, receiving/transmitting time 112b, total talk time (or call connection failure indication) 112c, and receiving/sending indicator 112d. The message information managing unit 1420 may extract only the entries defined by the message block format from the voice call information and the text message information, to generate the integrated message information.

In step S1500, the user interface managing unit 1430 then generates message blocks 111 and 112, in which the respective entries of the integrated message information are arranged, according to an arrangement rule defined by the message block format. The arrangement rule defines the position of each entry of the retrieved integrated message information to be displayed in the message blocks 111 and 112. In the example of FIG. 4, the counterpart identification information 111a, the message body 111b, and the receiving/transmitting time 111c may be defined to be displayed at a specific location of the message blocks 111 and 112, respectively. According to the arrangement rule, the user interface managing unit 1430 generates message blocks 111 and 112, in which the each entry of the retrieved integrated message information is arranged, at a position as shown in FIG. 4.

Then, in step S1600, the user interface managing unit 1430 generates a first message management user interface 100, in which voice call information and text message information are arranged, in the order of receiving/transmitting time.

The integrated message information generated by the message information managing unit 1420, and/or the message blocks 111 and 112 generated by the user interface managing unit 1430 may be stored in the memory 1500. Once the integrated message information and/or message blocks 111 and 112 are stored in the memory 1500, the user interface managing unit 1430 may retrieve the stored integrated message information and/or message blocks 111 and 112 to generate the first message management user interface 100 without repeating the above processes. In this case, for a new voice call and/or text message, the above-described processes may be performed to display the newly generate the message blocks 111 and 112 in the first message management user interface 100.

In the above examples, the message information managing unit 1420 edits of voice call information and text message information to generate and edit the integrated message information. However, the above processes may be performed by the user interface managing unit 1430 partially or entirely. For example, when a message block format defines that an entry related to the receiving/sending indicator is to be displayed using an arrow image, in step S1600, the user interface managing unit 1430 may replace the receiving/sending indicator with the arrow image when generating the first message management user interface 100.

The first message management user interface 100 of FIG. 4 includes a menu bar 120. The first message management user interface mode selection icons 121a, 121b and 121c, a search tool 122, and an address book icon 123 are displayed on the menu bar 120.

When the input window of the search tool 122 is touched, the user interface managing unit 1430 provides a character input user interface. When the user inputs a search word through the character input user interface, the user interface managing unit 1430 looks for the integrated message information including the input search word through a search engine built in the integrated message management part 1400, and displays the search result on the first message management user interface 100.

When the user touches the address book icon 123 of the menu bar 120, the user interface managing unit 1430 accesses the address book application and retrieves the contact information. At the same time, the user interface managing unit 1430 converts the first message management user interface 100 into an address book user interface, and displays it on a screen of the mobile terminal 10.

Upon receiving a user inputs selecting a message block of FIGS. 4 and 5, e.g., touching a message block 111, 112, details of the selected message block may be displayed on the terminal 10. The user interface managing unit 1430 may be configured to provide a second message management user interface, which displays details of a message in response to the user input of selecting the message blocks 111 and 112 of the first message management user interface 100.

Hereinafter, the process of generating the second message management user interface will be described in detail with reference to FIG. 6 and FIG. 7.

Figure 6:
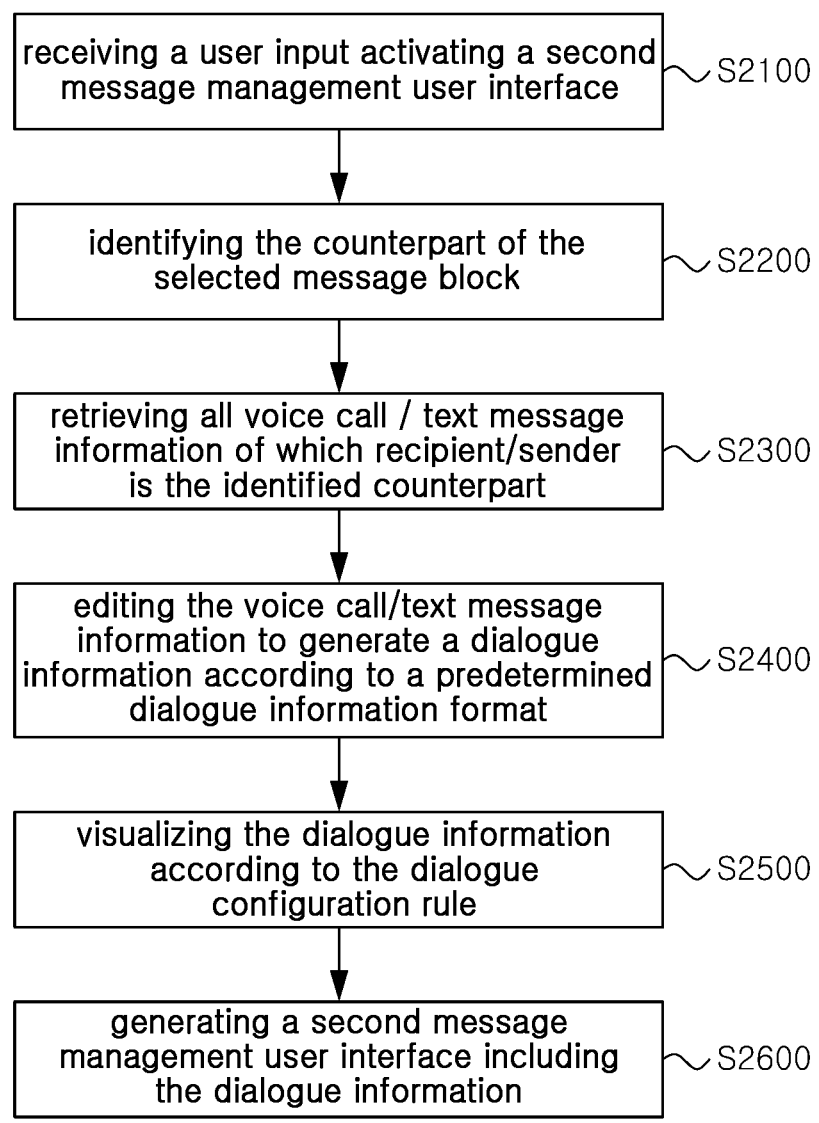
FIG. 6 is a flowchart illustrating a process of generating a second message management user interface.
Figure 7:
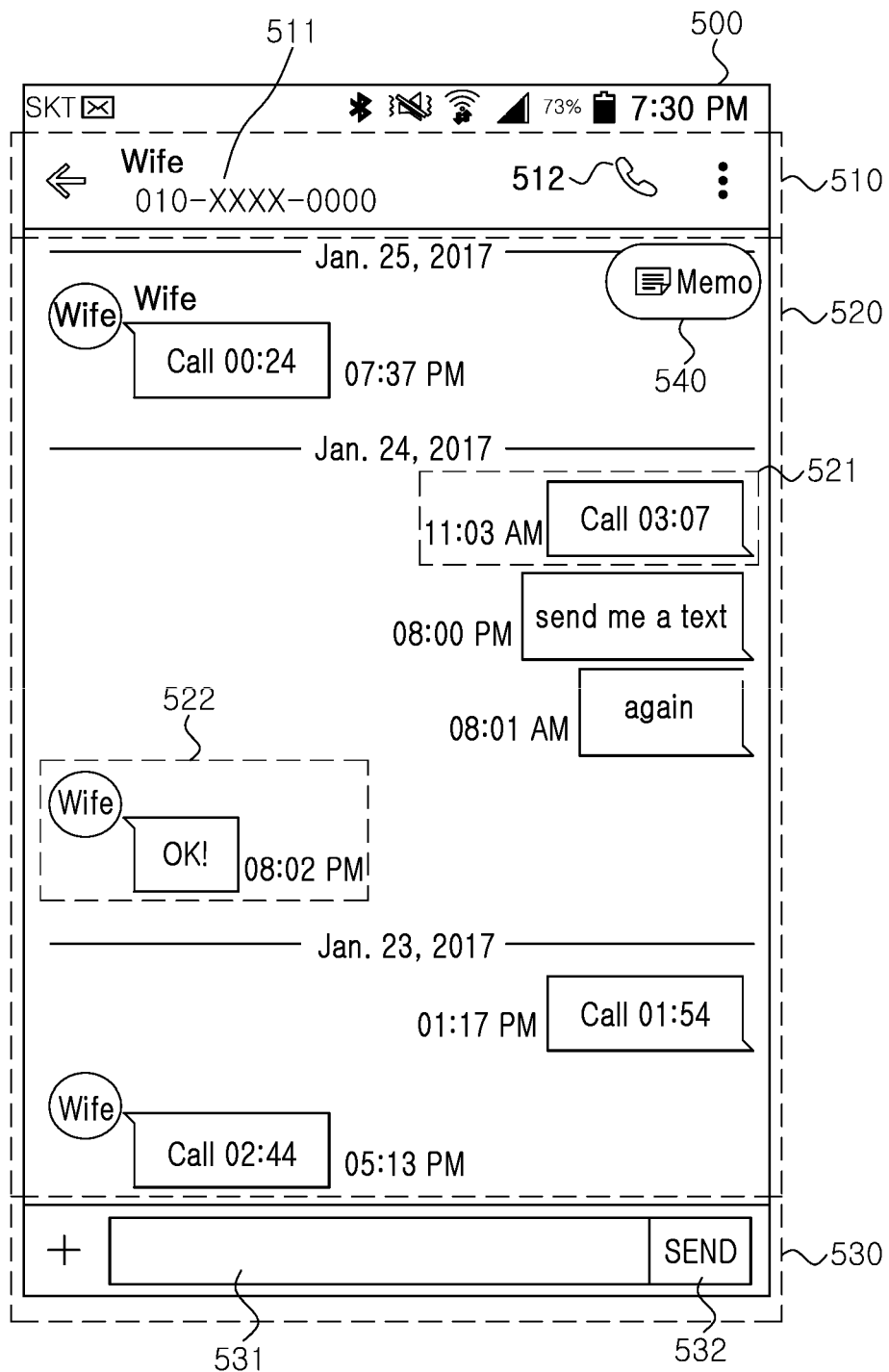
FIG. 7 is a screenshot showing an example of a second message management user interface provided by the integrated message management part.

FIG. 6 is a flowchart illustrating a process of creating a second message management user interface, and FIG. 7 is a screenshot illustrating an example of a second message management user interface provided by the integrated message management part 1400.

In step S2100, the user interface managing unit 1430 receives a user input activating a second message management user interface. The user input activating a second message management user interface may be, for example, the user touching the message blocks 111 and 112 of the first message management user interface 100, as described above. In addition, the user input activating the second message management user interface may be the user touching the message notification displayed on the status bar of the mobile terminal 10 when the integrated message information management application is not activated.

In step S2200, when a user input activating the second message management user interface is received, the user interface managing unit 1430 identifies the counterpart (recipient/sender) of the selected message block. In step S2300, the message information managing unit 1420 retrieves all of the voice call information and the text message information of which recipient/sender is the identified counterpart. In step S2400, the message information managing unit 1420 edits the voice call information and the text message information to generate a dialogue information according to a predetermined dialogue information format. The dialogue information format defines entries to be displayed and a notation of each entry. For example, the dialogue information format for a voice call may be defined as displaying receiving/sending time in a form of "HH:MM AM (or PM)" and total conversation time in a form of "HH:MM:SS". On the other hand, the dialogue format for the text message may be defined as displaying receiving/sending time in a form of "HH:MM AM (or PM)" and message body in a form of full-text of the message. The message information managing unit 1420 extracts only the entries defined by the dialogue information format from the voice call information and the text message information, and edits the extracted entries in the form defined by the dialogue information format to generate the dialogue information.

In the above described example, the step S2400 of generating dialogue information is described as being performed by the message information managing unit 1420. However, according to an exemplary embodiment, all or a part of the process in step S2400 may be performed by the user interface managing unit 1430.

Next, in step S2500, the user interface managing unit 1430 visualizes the dialogue information according to the dialogue configuration rule, and in step S2600, generates a second message management user interface including the dialogue information. The dialogue configuration rule defines the arrangement and display form of each entry of the dialogue information. For example, the dialogue information rule may define: 1) dialogue information of the incoming voice call and the text message is placed on the left side of the interface and dialogue information of the outgoing voice call and the text message is placed on the right side of the second message management user interface 500; 2) total conversation time of a voice call and full text of a message is provided in a form of a speech bubble; 3) the receiving/sending time is displayed outside the speech bubble; and 4) all the dialogue information is listed in descending order according to the receiving/sending time. The user interface managing unit 1430 processes and visualizes each entry of dialogue information according to the dialogue configuration rule, and generates a second message management user interface displaying the visualized results.

The second message management user interface generated according to the above exemplary dialog information format and dialog configuration rule is as shown in FIG. 7.

Referring to FIG. 7, the second message management user interface 500 includes a dialogue title region 510, a dialogue display region 520, and a character input region 530. In the title region 510, counterpart information and a telephone dialing icon is provided. In the dialogue display region 520, the dialogue information is displayed. For example, the unit dialogue 521 corresponds to an outgoing voice call. In accordance with the dialogue information format and the dialogue configuration rule, the total call time entry is inserted into a speech bubble in the form of "voice call 03:07" and sending time entry is displayed at left side of the speech bubble in a form of text string "11:03 AM". The unit dialogue 522 relates to a received text message. In accordance with the dialogue information format and the dialogue configuration rule, the received text is inserted into a speech bubble in the form of full text "OK!", and receiving time is displayed at right side of the speech bubble in a form of text string "08:02 PM". In addition, the unit dialogue 522 related to the received text message is arranged on the left side of the interface, the unit dialogue 521 related to the outgoing voice dialogue is arranged on the right side of the interface, and the dialogues are arranged in order of receiving/transmitting time.

The second message management user interface 500 is configured to provide detailed information on messages exchanged with a specific person (counterpart). For example, the second message management user interface 500 may be configured to provide information on voice calls and text messages exchanged with a specific user in an interactive manner. While the first message management user interface 100 lists information on all message in a time series, the second message management user interface 500 displays more detailed contents of messages exchanged with a specific entity.

The second message management user interface 500 may be provided in response to various user inputs. First, as described above, when the user interface managing unit 1430 detects a user input, such as touching a specific message block displayed on the first message management user interface 100 ("message block selection input"), the user interface managing unit 1430 identifies the counterpart (recipient or sender) of the selected message block. The user interface managing unit 1430 accesses the memory 1500 to retrieve integrated message information on voice calls/text messages received from and transmitted to the corresponding counterpart, generates the second message management user interface 500 by listing the retrieved integrated message information in a time series, and displays it on the mobile terminal 10. As such, in response to the user's message block selection input, the user interface managing unit 1430 switches the first message management user interface 100 to the second message management user interface 500.

The second message management user interface 500 may display and provide each message information in an interactive format. For example, referring to FIG. 7, the information on a received message is displayed on the left side, and the information on a transmitted message is displayed on the right side. The incoming speech bubble 522 and the outgoing speech bubble 521 may have different colors or fonts for easy identification.

The second message management user interface 500 may be configured to include a character input region 530. The character input region 530 may be disposed at the lower end of the second message management user interface 500, as shown in second message management user interface 200 of FIG. 17. The character input region 530 includes a character input window 531 and a "send" graphical user interface 532.

The artificial intelligence agent 1440 analyzes the contents of the incoming and outgoing text messages, and provides one or more services corresponding to the analyzed message contents to the user.

Hereinafter, the configuration and operation of the AI agent 1440 will be described in detail with reference to FIG. 8.

Figure 8:
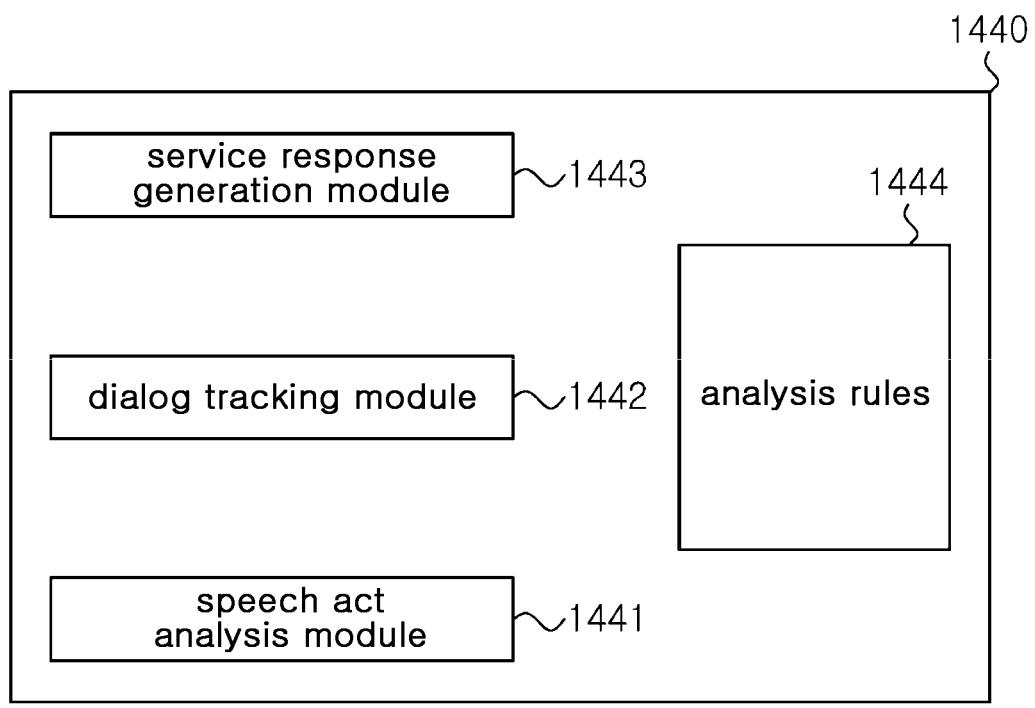
FIG. 8 is a block diagram illustrating an artificial intelligence (AI) agent according to an exemplary embodiment of the present invention.

FIG. 8 is a block diagram illustrating the configuration of an artificial intelligence agent 1440 according to an embodiment of the present invention.

The artificial intelligence agent 1440 is configured to include a speech act analysis module 1441, a dialog tracking module 1442, and a service response generation module 1443, each of which may be software, hardware, or a combination of hardware and software configured to perform its respective function.

The speech act analysis module 1441 performs morpheme analysis and speech act analysis on the messages of the user and the conversation partner. The morpheme analysis is a process of separating the text of the message into morpheme units, that is, dictionary headwords, restoring the original form of the deformed morpheme, and obtaining consecutive morphemes matching a word formation rules from the separated unit morphemes. Speech act analysis is performed for each unit of speech, and it is a process of deducing the purpose of a message from the format of the unit of speech. A speech unit may be a corpus which may end with a sentence final ending and ending signs such as a period, a question mark, an exclamation mark, and the like. The unit of speech is analyzed to a primary speech act which is the speaker's purpose of the communication, an intended subject which is a subject intended to convey to an audience through the message, and the related element which is a specific entity related to the intended subject. Each speech unit may be analyzed by the speech act analysis module 1441 and tagged in the form of a '[primary speech act]_[intended subject]_[related element]'. For example, the speech act analysis process for a sentence "When will be the next meeting?" will be described as follows. First, this sentence is divided into plural morphemes by morpheme analysis, and the meaning of each morpheme is grasped. Next, the speech act analysis is performed for analyzing the format and intent of this message. Since the message begins with an interrogative adverbial "when" and ends with the question mark "?", the purpose of this sentence (primary speech act) is 'question on time' (i.e. request for information on time). In addition, through this message, the subject intended by the speaker, that is, the intended subject is a 'decision of meeting date', and the related element which is a concrete object related to the meaning action is 'next meeting'. As another example, the process of the speech act analysis of the message "6 o'clock is not available because the reservation is full" is as follows. Through morpheme analysis and analysis of sentences, the purpose of the sentence may be analyzed as 'delivery of information' since this sentence is terminated by a period and contains specific information. The subject of the speaker intended to deliver through the sentence, that is, the intended subject is 'rejection', and the related element (object of rejection) related to the rejection is '6 o'clock reservation'. The speech act analysis module 1441 of the present invention grasps the purpose, the intention of the speaker, and the related elements of a message as a speech act unit through the speech act analysis.

The dialog tracking module 1442 performs a function of continuously tracking messages included in a conversation between two or more speakers. The dialog tracking function trace of morpheme/speech act analysis on an each message based on the context of conversation between two or more speakers. For example, the dialog tracking module 1442 may be configured to trace the results of speech act analysis of each message included in the conversation list displayed on the second message management user interface according to one embodiment of the present invention.

The service response generation module 1443 generates responses corresponding to the intent and purpose analyzed by the speech act analysis module 1441 and/or the dialog tracking module 1442 and provides the responses for the user. A response generated by the service response generation module 1443 of the AI agent 1440 may be provided in association with the additional function process part 1300.

Figure 9:
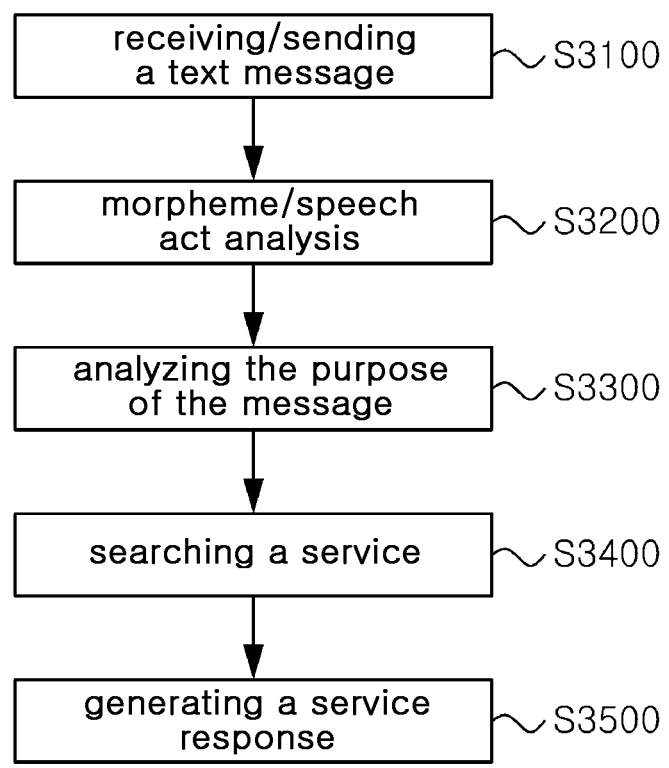
FIG. 9 is a flow chart illustrating a general process of a service performed by an AI agent according to an exemplary embodiment of the present invention.

FIG. 9 is a flowchart illustrating a service processing procedure of the AI agent 1440 according to an embodiment of the present invention.

First, the message monitoring unit 1410 monitors reception and transmission of a text message from the text message management part 1200 (S3100). The artificial intelligence agent 1440 performs morpheme analysis and speech act analysis on the received or transmitted text message (S3200), and analyzes the intent of the message using the result of the morpheme analysis and the speech act analysis (S3300). Morpheme/speech act analysis and message intention analysis is performed by the speech act analysis module 1441 and dialog tracking module 1442 of the artificial intelligence agent 1440. Then, the service response generation module 1443 of the AI agent 1440 searches for a service corresponding to the analyzed message intention (S3400), generates a service response corresponding to the analyzed message intention, and provides the service response for the user terminal S3500).

Hereinafter, the operation of the AI agent 1440 will be described in detail with an example of a service.

<Generation of Schedule Information>

According to an embodiment of the present invention, the AI 1440 may be configured to provide a service for analyzing text included in the conversation list to generate schedule information.

First, the speech act analysis module 1441 of the artificial intelligence agent 1440 performs morpheme analysis and speech act analysis on a new incoming/outgoing text message, and determines whether there is a morpheme related to a schedule in the result of the analysis. A schedule is a list of something to be done at a specific time or period, so it is related to time. Therefore, it is possible to determine the relevance to a schedule by determining whether there is a time-related morpheme in the receiving or originating message. Identification of the morpheme associated with a schedule can be performed in various ways. For example, the speech act analysis module 1441 may be configured to identify morpheme having a specific format indicating a date and time. For more specific example, the artificial intelligence agent 1440 may be configured to identify a format of YYYY/MM/DD, YYYY.MM.DD, MM/DD or, MM.DD, YYYY, Monday, today, tomorrow, hh:mm am(pm) and the like, which indicates a specific time. In addition, since an interrogative sentence may be used for arranging time before the schedule has not be confirmed yet, the AI 1440 maybe configured to identify morphemes such as "when", "which day" and the question mark "?" as morphemes related to a schedule.

If it is determined by the morpheme analysis that the message includes the morphemes related to a schedule, the speech act analysis module 1441 of the artificial intelligence agent 1440 performs the analysis of the speech to grasp the intent and the contents of the message. In other words, the speech act analysis module 1441 performs an analysis of a single incoming/outgoing message to identify specific information related to a schedule included in the message, that is, information such as planned work, place, related persons, and so on.

In general, a schedule includes a specific time and a task (action) scheduled at the specific time, as necessary items. In order to perform the process of generating schedule information according to the present invention, either time or task needs to be specified. For a message of which a task has been specified but time has not been yet specified, or for a message of which time has been specified but a task has not been specified, subsequent processing for generating schedule information is performed. However, for messages that do not have two items, No subsequent processing for generating schedule information is performed. A typical example of a schedule-related message that does not specify time is a suggestion such as "Let's go to a movie." A typical example of a schedule-related message that does not specify a task is "What are you doing today?". Additional information that constitutes the schedule may include the space (place) where the task is performed, the other party (or collaborator) related to the task, the end time (period) of the work, and other information.

The AI 1440 according to an exemplary embodiment of the present invention analyzes the message and generates schedule information having the following data entries.

Schedule information: [time]_[task]_[place]_[related person]_[end time of work]_[additional information]

For such morpheme analysis and speech act analysis of the artificial intelligence agent 1440, rules for each analysis are required. Analysis rules are generated based on the dialogue model. A dialog model is data modeling conversations, i.e., messages exchanged between two or more speakers. The server may be configured to collect user's conversation data for establishing a dialog model. The server may use the message exchange through the message integration management platform according to the present invention as well as use the dialog data outside the platform to construct the dialog model.

The dialogue model is largely classified into a rule-based model and a statistical-based model. Representative rule-based models include a plan-based dialogue model and an active ontology-based dialogue model. A plan-based dialogue model is a way of designing a dialogue model by dividing a work into a domain, problem solving, and detailed plan of discourse so that the work can be easily and flexibly adjusted according to the agenda. An active ontology-based dialogue model divides work into concepts in ontology and generates a system response structure necessary for service through inference. Representative statistical based models include an example-based dialogue model and a Partially Observable Markov Decision Process (POMDP). The example-based dialog model is configured to generate a dialogue example index using the language analysis engines for the dialogue example big data object, and to search the dialogue example index to find the most similar example to the user's speech act. POMDP is a reinforcement learning model that probabilistically models user behavior by learning from past conversation histories.

The server generates analysis rules and response rules based on the dialog model.

The analysis rules and response rules generated by the server are downloaded and installed in the user terminal. The server may update the dialog model and analysis rules 1444 and response rules based on the collected data. In this case, the server may transmit the updated analysis rule 1444 and the response rule to the user terminal, so that the artificial intelligence agent 1440 installed in the user terminal performs the operation with reference to the updated analysis rule 1444 and the response rule.

The artificial intelligence agent 1440 according to the present invention is configured to analyze incoming and outgoing messages according to analysis rules 1444 generated based on one of the above dialog model and to provide a service, as a response, corresponding to the analysis results. That is, the artificial intelligence agent 1440 may provide various services through the service response generation module 1443.

It is possible to classify the schedule related messages by type and follow the process of determining the schedule in the conversation between two or more speakers according to the message type. According to an embodiment of the present invention, the artificial intelligence agent 1440 is configured to determine the type of dialogue through speech act analysis and to perform the message analysis routine according to the identified message type of the dialogue to generate the schedule information.

According to one embodiment of the present invention, the type of conversation for arranging a schedule may be determined according to the first message that triggers the conversation related to the schedule, which may be classified as follows.

Type 1 (notification type): A message that unilaterally specifies time and task, which is the minimum item necessary for schedule establishment. A schedule specified in the message is established regardless of the recipient's intention.

Type 2 (complete proposal type): A message that proposes to the other party a time and task, which are the minimum items necessary for scheduling A consent of the recipient of the message is required. The first proposed schedule may be replaced by another schedule (alternative) in process of conversation between the two speakers. In order to fix an alternative as a schedule, the consent of the recipient of the message containing the alternative is required. Therefore, for the initial proposal of Type 2, the follow-up messages should be analyzed to determine whether the other party's consent, whether or not an alternative is presented, and whether there is consent to the alternative. "Are you ok with Next meeting on February 18?" would be an example of this type.

Type 3 (incomplete proposal type): A message containing a proposal that does not specify either time or task. In case of belonging to this type, it is necessary to specify the non-specified item that in order to generate schedule information. Therefore, for the initial proposal of type 3, the follow-up message should be analyzed to determine whether the unspecified item of the initial proposal has been specified. If the initial proposal is specified through the follow-up messages, the specified proposal has the same properties as the type 2. "Let's play golf" and "When will the next general meeting be?" is an example of the Type 3 message.

The above message classification is an exemplary classification, but the messages may be classified in a different way based on the collected conversation data and the dialog model.

First, a process of determine a schedule for a first type message, i.e., a notification type message will be described as follows.

When one party notifies that a specific action is scheduled at a specific time, the notified time and action are fixed to a schedule. The message to notify the schedule is usually in the form of a declarative or imperative sentence. However, messages delivering schedule information in the form of statements and statements are not necessarily notice of a fixed schedule. The speech act analysis module 1441 of the artificial intelligence agent 1440 according to an embodiment of the present invention may be configured to refer to the sender information of the message to determine whether the received message is a message for notice of a fixed schedule. Generally, a fixed schedule notification is often received from a specific opponent. For example, a notice of various due dates delivered by a government office, a notice of maturity and payment due delivered by a financial institution, a reservation confirmation delivered by a travel agency or an airline, and a notice of a scheduled shipping time delivered by a shipping company are notifications related to a fixed schedule. Thus, the speech act analysis module 1441 of the AI 1440 may be configured to analyze the sender information included in the message to determine whether the message is related to a fixed schedule. In general, a schedule includes a task and at a specific time as essential items. Other additional information constituting the schedule may include a space (place) where the task is performed, a partner (or collaborator) related to the task, a termination time (period) of the task, and other information.

Type 2 and Type 3 have different schedule generation paths than Type 1. That is, when the messages of type 2 and type 3 are transmitted to the other party in the form of a proposal or a question of one of a plurality of speakers, a conversation for establishing a schedule is started by this message. Hereinafter, the first proposal or question relating to a schedule will be referred to as an 'initial proposal', and the speaker presenting the initial proposal will be referred to as a 'first speaker' and the other party referred to as a 'second speaker'. Also, a set of messages exchanged between two speakers is called 'conversation', and a message generated after one message is called 'subsequent message'. Further, a pair of consecutive messages between two speakers is called a 'neighbor message pair'. For example, a message of a first speaker and a message of subsequent response of the second speaker form a neighbor message pair. In general, the neighbor message pair may be two adjacent messages displayed on the second message management user interface, but in some cases, a plurality of messages may form a neighboring message pair. For example, when a second speaker responds to a plurality of consecutive messages of the first speaker with one message, the entire (logical AND) of the plurality of messages of the first speaker and the messages of the second speaker form a neighbor message pair.

Messages belonging to type 2 or type 3 have the form of a suggestion or question. The suggesting sentence is typically terminated by a sentence starting with a syntactic unit "Let's ~", "Why don't ~" "Would ~", and the like. A question typically start with an interrogative and terminates with a question mark "?". Questions may be classified into polar questions (yes-no questions) to which answer is yes or no, and non-polar questions (wh-questions) which requires a specific answer accompanied by an interrogatory.

Although time and task are specified in the type 2 message, the schedule contained in the message is confirmed only when the consent of the second speaker is received. Thus, the AI 1440 tracks subsequent messages to determine whether the second speaker agrees with the schedule proposed by the first speaker. If there is consent of the second speaker, the schedule proposed by the first speaker is confirmed. If there is no consent of the second speaker, the artificial intelligence agent 1440 determines whether there is a counter offer for the initial offer of the initial message. The alternative (counter offer) may also be presented by the first speaker or the second speaker. Since this alternative proposal also requires the consent of the other party who proposed the alternative, the AI 1440 tracks and analyzes the follow-up messages to confirm whether the other party agrees to the alternative presentation. The presentation of the alternative may be repeated several times between the first speaker and the second speaker.

According to ordinary message exchange cases, consent or rejection of a proposal may not follow it immediately. For example, a person who has been offered a schedule may ask after the proposer before approval or rejection. In addition, after a negative reply, the conversation for rearrangement of a schedule may be continued by the presentation of the first proposer's or the other party's alternative. Therefore, when a response to the proposal of a schedule does not include an agreement, the schedule information generation function does not work correctly if the determination of agreement is performed for only a single message consecutive to the proposal. Therefore, it is desirable to keep track of the messages exchanged after the initial proposal for a considerable period of time to determine whether the consent or alternatives are presented. However, infinitely continuing message tracking for detection of alternatives and consent for the initial offer may increase the processing load of the mobile terminal and exceed the capabilities of the AI 1440, the number of performing the message tracking may be suitably limited by the analysis rule 1444. For example, the analysis rule 1444 may regulate that the second speaker's consent and alternative presentation are to be tracked only for N subsequent messages (where N is a natural number) from the initial proposal. That is, the AI 1440 stops message tracking and the schedule information generation process if no consent of the second speaker or presentation of an alternative within the n subsequent messages from the initial proposal. If a consent message of the second speaker is detected within the subsequent message from the initial proposal, the artificial intelligence agent 1440 confirms the schedule information. Also, if there is an alternative presentation by the first speaker or the second speaker, the message tracking is continued from the presentation of the alternative, even if there is no agreement of the second speaker within the subsequent message. In this case, the same restriction as the initial proposal is applied to the presentation of alternatives, that is, the AI agent monitors whether a consent or other alternatives are presented within N subsequent messages after the presentation of the alternative. N is determined on the basis of a dialogue model. In a typical conversation, a consent on a schedule or presentation of an alternative is made within 1-5 consecutive messages, so N may be determined about 5.

A message of type 3 cannot confirm the schedule even with the consent of the other party. This is because the initial proposal of this type is a simple proposal that does not specify a date and time. In order for specific schedule information to be generated by the initial proposal of type 3, the time must be specified by the first speaker and the second speaker. Thus, if a suggestion of type 3 is presented, the AI 1440 tracks the subsequent messages to determine if the schedule is materialized. The materialization of the schedule is made by proposal of a specific time and agreement to the proposal of the time between the first speaker and the second speaker. In other words, the AI 1440 tracks and analyzes the messages following the initial proposal and determines whether the first speaker or the second speaker suggests a specific date and time. The process of tracking and analyzing the proposal and the consent of the other party is carried out in the same manner as tracking and analyzing the first proposal (or alternative) and agreement for the type 2 message.

The artificial intelligence agent 1440 may generate and use schedule information even when the dialog including the type 2 and type 3 messages is tracked and analyzed. For example, according to an embodiment of the present invention, the AI 1440 may be configured to generate and temporarily store schedule information for an initial proposal, and to update the temporarily stored schedule information whenever an alternative is presented. The updated schedule information is temporarily stored in the memory 1500 of the user terminal until the other party agrees. At this time, temporary storage of the schedule information is maintained only within the message tracking limit described above. For example, if no consent or alternative is presented within the N subsequent messages from the initial proposal, the temporarily stored schedule information is deleted in memory 1500 and the tracking is stopped.

Figure 10:
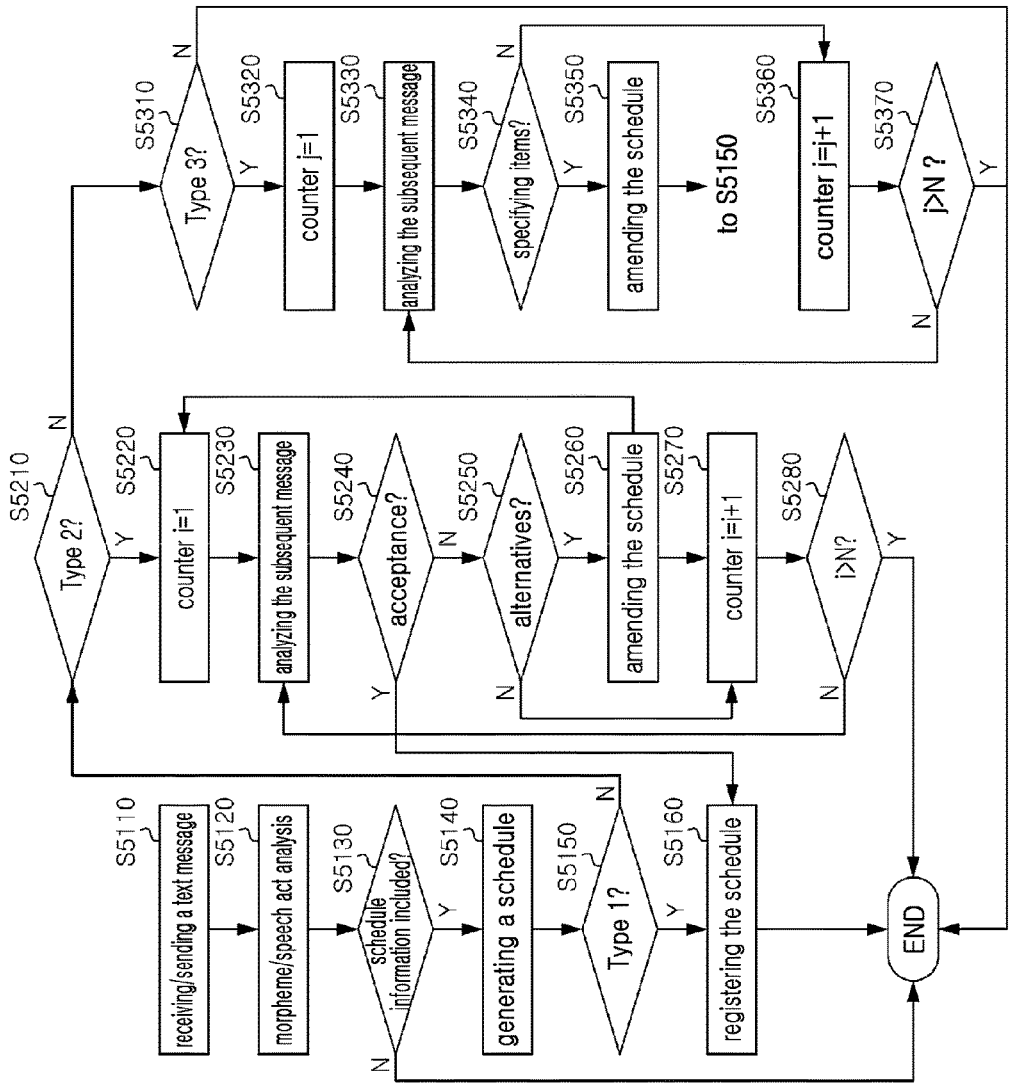
FIG. 10 is a flowchart illustrating a process for generating schedule information performed by an AI agent according to an exemplary embodiment of the present invention.

FIG. 10 is a flowchart illustrating a process of generating schedule information of the AI agent 1440 according to an embodiment of the present invention.

The artificial intelligence agent 1440 receives the text message received from the mobile terminal or transmitted through the mobile terminal (S5110). The incoming and outgoing text messages may be transmitted to the artificial intelligence agent through the text message management part 1200 or the message monitoring unit 1410 of the integrated message management part 1400.

The speech act analysis module 1441 of the artificial intelligence agent 1440 performs morpheme analysis and speech act analysis on the received or transmitted text message (S5120), and determines whether the message includes necessary items for generating schedule information (S5130). Whether or not the necessary items for generating the schedule information are included is judged based on presence of a morpheme having a temporal meaning (time related morpheme), of the relationship between the morpheme representing time (time related morpheme) and presence or absence of a morpheme representing an action or a state (task related morpheme), and a relationship between the two morphemes. Specifically, the speech act analysis module 1441 of the artificial intelligence agent 1440 divides the texts of the received or outgoing text messages by morphemes (morpheme analysis), analyzes the meaning of each morphemes, the relationship between the morphemes, and the structure of the sentences to interpret the intent of the message (speech act analysis). That is, the artificial intelligence agent 1440 judges whether a time-related morpheme and a work-related morpheme present in the message through the morpheme analysis and the speech act analysis as mentioned above, and determines whether the intent of the message is to establish a schedule.

If it is determined that the message contains a necessary item for generating schedule information, the service response generation module 1443 generates schedule information (S5140). The generated schedule information is temporarily stored in the memory 1500.

If it is determined that the message includes none of the necessary items, the service response generation module 1443 ends (END) the process for generating schedule information.

Following the morpheme/speech act analysis of the message by the speech act analysis module 1441, the artificial intelligence agent 1440 determines whether the message belongs to a type 1, i.e., a notification type message for notifying a specific task at a particular time (S5150).

If the message is determined to be a type 1 message, the artificial intelligence agent 1440 executes the schedule management application and registers the generated schedule information (S5160).

The schedule information registration process may be performed in various ways. According to an embodiment of the present invention, the service response generation module 1443 may be configured to automatically execute the schedule management application without the user's intervention, write the generated schedule information into the schedule management application, and register the schedule information. At this time, the service response generation module 1443 may be configured to store a message related to schedule information or entire conversation in association with the generated schedule information. For example, the service response generation module 1443 may be configured to insert, into the schedule information, a link to access a final agreement message or the conversation containing the message. The user can view the schedule information through the schedule management application. At this time, the user may execute the link to check the message or conversation related to the schedule.

According to another embodiment of the present invention, the service response generation module 1443 can be configured to check whether the user approves the registration of the generated schedule information. For example, the service response generation module 1443 transmits the generated schedule information to the user interface managing unit 1430, and requests the generation of the schedule information registration graphical user interface thorough which a user can confirm the approval/rejection of the user for the schedule information. At this time, the service response generation module 1443 may be configured to have a speech generation function of constructing the generated schedule information as a sentence and providing it to the user. When the approval input of the user is received through the schedule information registration graphical user interface, the service response generation module 1443 executes schedule management application and registers the generated schedule information.

If it is determined that the incoming/outgoing message is not a type 1 of notification message, the AI agent determines that the message is a Type 2 of complete proposal message (S5210). If it is determined which the incoming/outgoing message corresponds to a type 2 message, the AI agent 1440 tracks and analyzes the subsequent message. At this time, as described above, the message counter is initialized to limit the execution length of the trace analysis routine for the subsequent messages to N messages (N is a natural number). Therefore, the value i of the message counter is set to the initial value 1 (S5220).

The artificial intelligence agent 1440 performs the morpheme analysis and the speech act analysis on the adjacent subsequent message (i=1) (S5230). That is, the speech act analysis module 1441 of the artificial intelligence agent 1440 performs morpheme analysis and speech act analysis on the message immediately following the initial proposal.

The artificial intelligence agent 1440 determines whether the neighboring subsequent message (i=1) agrees with the initial proposal using the morpheme/speech act analysis result (S5240). If it is determined that the neighboring response message (i=1) is consent to the schedule proposed by the first speaker, the service response generation module 1443 performs a process for registering the schedule information (S5160). The processing for the schedule information registration is performed in the same manner as the case of the type 1 message described above.

If it is determined that the response message is not a consent to the proposed schedule, the AI 1440 determines whether an alternative is presented in this message (i=1) (S5250), through the morpheme/phonetic analysis for the subsequent message (i=1). Since the presentation of the alternative is another proposal, it may be determined whether the message (i=1) is an alternative presentation by the same method as the morpheme/speech act analysis method for the initial proposal.

If it is determined that the message (i=1) is an alternative presentation, the artificial intelligence agent 1440 updates the schedule information using the items included in the alternative and temporarily stores the updated schedule information in the memory 1500 (S5260).

Since the alternative is a new proposal, the confirmation of the schedule requires the other's agreement on the alternative. Therefore, the AI 1440 should track and analyze the message following the alternative message (i=1). At this time, it is preferable to apply the same restriction of the tracking routine for the initial proposal to the alternative consent tracking routine, so the message counter is initialized (S5230). That is, by the alternative presentation message, the message counter value is initialized to i=1, and the number of performance of tracking messages subsequent to the alternative message is limited to N.

If the message (i=1) does not correspond to the alternative presentation, the AI 1440 increments the message counter by 1 (S5270) to analyze the next message, and if the increased message counter value exceeds the maximum allowed routine repeat It is determined whether the number N is exceeded (S5280). If the increased message counter value does not exceed N, the AI agent 1440 repeats the above-described routine of S5230 to S5280 for the subsequent message (i=2). The execution of the routine of S5230 to S5280 is stopped when the message counter value exceeds the maximum number of routine repetitions N, and the AI agent 1440 ends the constant information generation processing.

If the message does not correspond to type 2, the artificial intelligence agent 1440 determines whether the message corresponds to type 3 using the morpheme/speech act analysis result of the message (S5310).

If it is determined that the message does not correspond to type 3, the AI 1440 ends the process of generating the predetermined information.

The type 3 message needs to specify the essential items by the subsequent messages for schedule confirmation. Accordingly, if it is determined that the incoming/outgoing message corresponds to the type 3 message, the AI agent 1440 tracks and analyzes the subsequent message. In this case, as described above, the AI agent 1440 operates the message counter to limit the execution length of the trace analysis routine of the subsequent message to M messages (M is a natural number). At this time, the value j of the message counter is set to the initial value 1 (S5320).

The artificial intelligence agent 1440 performs morpheme analysis and speech act analysis on the adjacent message (j=1). That is, the artificial intelligence agent 1440 performs morpheme analysis and speech act analysis on the message immediately following the initial proposal (S5330).

Then, the artificial intelligence agent 1440 determines whether the adjacent subsequent message (j=1) is a message specifying the schedule proposed by the first speaker, using the morpheme analysis and speech act analysis results (S5340).

If it is determined that the neighbor subsequent message (j=1) is a message specifying the first proposal, the AI 1440 updates the schedule information using the items included in the neighbor subsequent message (S5350). A message materializing the incomplete proposal belongs to type 1 or type 2. Therefore, the artificial intelligent agent determines whether the neighbor subsequent message (j=1) belongs to type 1 using the morpheme/speech act analysis result of the adjacent subsequent message (j=1) (S5150), and registering the schedule information if the neighbor subsequent message is type 1 message (S5160). If the neighbor subsequent message (j=1) does not belong to type 1, it belongs to type 2, and thus the AI agent 1440 performs the processes of S5220 to S5280 described above.

If it is determined that the neighbor subsequent message (j=1) is not a message specifying the first proposal, the AI 1440 increments the message counter value by 1 (S5360), and if the increased message counter value is the maximum number of routine repetitions M is exceeded (S5370). If the increased message counter value exceeds M, the AI 1440 stops the message tracking and the schedule generation process. If the increased message counter value does not exceed M, the process of S5330 to S5370 is repeated for the next message.

Hereinafter, a type 1 message analysis and schedule information generation operation according to an exemplary embodiment of the present invention will be described in detail with reference to the following received text message.

<Exemplary Received Text Message>

"From Seoul City,

The deadline for the local tax payment of Hong Gil-dong is Mar. 30, 2017. For more information, please visit www.tax.seolul.go".

First, the speech act analysis module 1441 divides the text included in the received text message into morphemes, which are the smallest units having meaning, and analyzes the usage of each morpheme. This received text message may be morpheme-analyzed as follows.

<Morpheme Analysis Result>

The (definite article)–deadline (noun)–for (preposition)–local tax (noun+noun)–payment (noun)/of (preposition)–Hong Gil-dong (proper name)–is (verb)–Mar. 30, 2017 (proper noun+numeral+numeral, date).

The artificial intelligence agent 1440 recognizes that the morpheme continuum "Mar. 30, 2017" indicating the specific time is included in the received text message through the speech act analysis module 1441. Then, the speech act analysis module 1441 analyzes the relationship of each morpheme, that is, the structure of the sentence, to determine what the date is related to. The speech act analysis module 1441 determines that the message is a declarative sentence based on the relationship between the date and the verb "is", and that the purpose of the message (primary speech act) is the delivery (i.e., notification) of the information on date. Subsequently, the speech act analysis module 1441 recognizes that the subject of this sentence is deadline of local tax payment based on connection between "deadline of local tax payment" and "is". Therefore, the speech act analysis module 1441 interprets "Mar. 30, 2017" and "deadline of local tax payment" is time and task, respectively for a schedule, and then generates schedule information as follows. In addition, 'Seoul City', a sender of the message, is added to the related item, and the hyperlink providing the related information is added to the additional information item, respectively.

<Schedule Information Data>

[2017.3.30]_[deadline of local tax payment]_[N/A]_ [Seoul City]_[www.tax.seolul.go]

According to the analysis, since this message corresponds to the type 1 for a certain notification purpose, the service response generation module 1443 performs a process of registering the generated schedule information.

The schedule information registration process is performed through the above-described process.

As described above, when the schedule cannot be determined by the morpheme analysis and the speech act analysis, that is, for the type 2 or type 3 message, the context of the conversation should be analyzed by the dialog analysis module in order to generate the schedule information.

Hereinafter, an operation of message analysis and schedule information generation for the type 3 messages according to an embodiment of the present invention will be described in detail with reference to FIG. 11.

Figure 11:
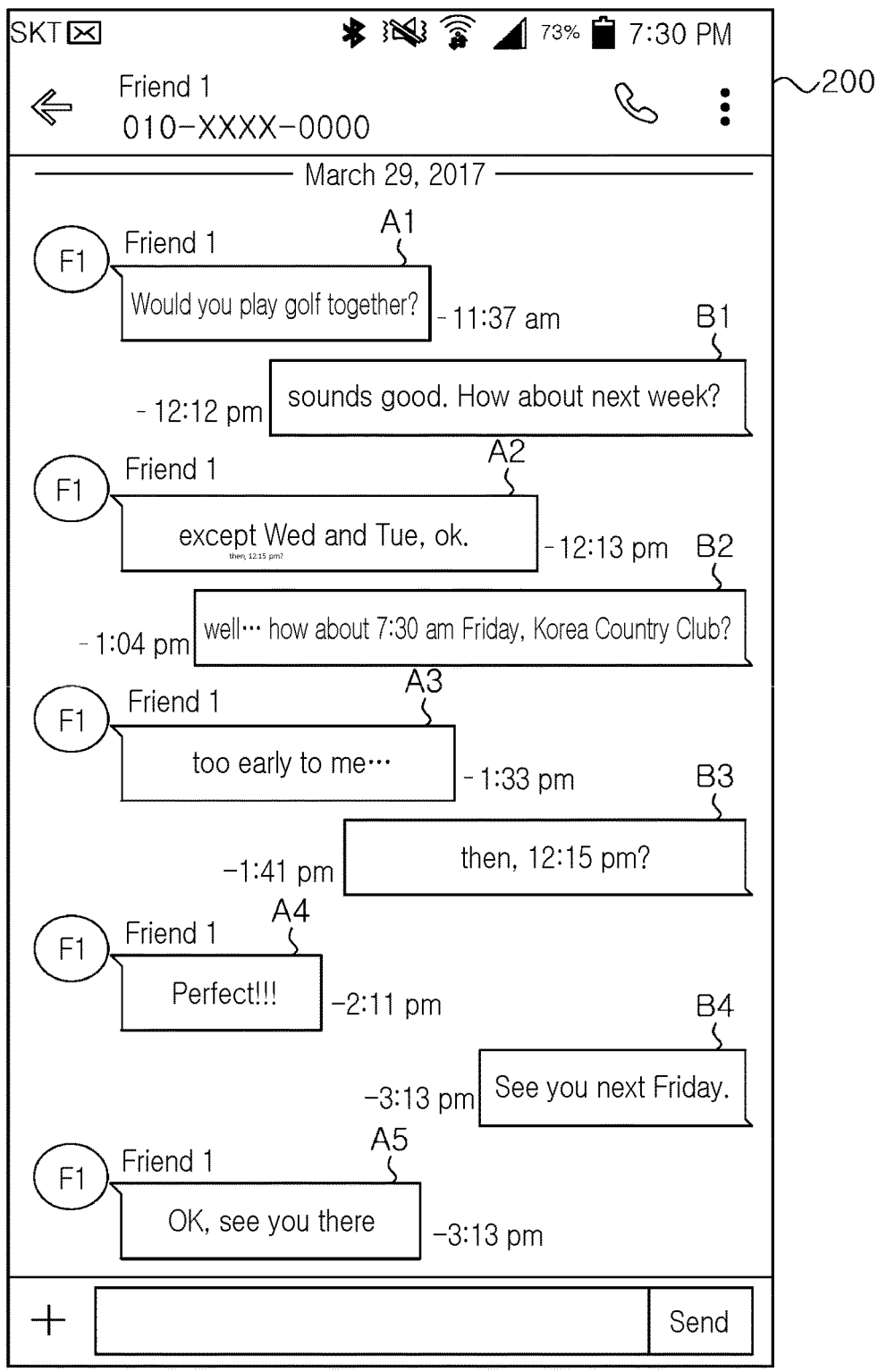
FIG. 11 is a screen shot showing a second message management user interface displaying a dialog between the user of the mobile terminal and a friend of the user.

FIG. 11 is a screen shot showing a second message management user interface 200 displaying a dialog between the user of the mobile terminal and a friend of the user.

First, the artificial intelligence agent 1440 performs morpheme analysis on the received message A1 through the speech act analysis module 1441, and detects a morpheme when the message A1 refers to an unspecified time. Next, the speech act analysis module performs speech act analysis for the message A1. The speech act analysis module recognizes that the message A1 suggests playing "golf" without specifying the time, based on the entire sentence structure and the connection or relationship between each morpheme. More specifically, since the morphemes "would you" contained in the message A1 is a typical sentence start indicating an ask or suggestion, the speech act analysis module determines the purpose of the message, that is, the primary speech act is a suggestion, and that object of the suggestion is playing golf together. The 'playing golf together' which is the object of the suggestion, but the message A1 does not specify time. Accordingly, the AI agent 1440 recognizes that the message A1 is a message corresponding to type 3, and that the user intends to propose golf without specifying the time. Therefore, the AI agent tracks and analyzes the message following the message A1. At this time, the artificial intelligence agent 1440 initializes the message counter and counts the message. That is, the artificial intelligence agent 1440 performs morpheme analysis and transcriptional analysis on the message B1 (j=1) following the message A1. Meanwhile, the artificial intelligence agent 1440 generates schedule information and temporarily stores the generated schedule information in the memory 1500 of the user terminal. The data structure of the generated schedule information is as follows.

[N/A]_[Golf]_[N/A]_[Friends 1]_[N/A]_[N/A]

Message B1 contains two phrase, "sounds good" and "how about next week". The speech act analysis module 1441 performs morpheme analysis on two sentences, and performs speech act analysis based on sentence structure and relationship between the analyzed morphemes. The speech act analysis module regards the message B1 as an agreement to Friend 1's proposal from the first sentence, "sounds good"

In addition, the speech act analysis determines that the message B1 has a purpose of materializing the initial proposal of Friend 1, which does not specify 'when', based on the contextual connection between the morphemes "how about" and "next week". However, the morphemes "next week" contained in message B1 is not perfect to specify the starting time of the planned task 'golf'. Thus, the AI agent 1440 increments the message counter value by one and then compares this value with 5, which is the maximum allowable number of repeating the routine. Since the increased message counter value is 2, it is smaller than the maximum allowable number 5, so that dialog tracking and the message analysis are continued for the next message (j=2). Meanwhile, since the starting point of the planned task 'golf' may not be specified, the schedule information generated and temporarily stored by the initial proposal is not updated.

Artificial intelligence agent 1440 performs morpheme analysis and speech act analysis on the following message A2. The message A2 contains a morpheme "OK" expressing positive intent, a preposition "except" meaning exclusion, nouns "Wed" and "Tue", which specifies a day of the 'next week'. The speech act analysis module of the artificial intelligence agent 1440 recognizes, from the meaning of these morphemes and their connection, that message A2 is intended to convey partial agreement on message B1. However, since no concrete time is provided by this agreement, the AI 1440 increments the message counter value by 1 and then compares this value with the maximum allowable number of routine iterations 5. Since the increased message counter value is 3 smaller than the maximum allowable number 5, the trace and analysis for the next subsequent message B2 (j=3) is continued.

Artificial intelligence agent 1440 performs morpheme analysis and speech act analysis on the following message B2 (j=3). Message B2 is a morpheme continuum containing "how about", which express a suggestion, "7:30 am", which represent time, "Friday", which represent a day of a week, "Korea Country Club", which is a name of a place. The speech act analysis module determines, from the meaning of each morpheme in the message B2 and its connection relationship, that the message B2 proposes a specific date and time and place, and asks whether the other party agrees. Since the message B2 includes the specific time and place, it is necessary to update the temporarily stored schedule information. Accordingly, the artificial intelligence agent 1440 updates the temporarily stored schedule information as follows.

[2017.4.7, 7:30]_[Golf]_[Korea Country Club]_[Friends 1]_[ ]

Since the message B2 corresponds to a proposal of a schedule belonging to type 2, it is necessary to determine whether or not the other party agrees with the message. Therefore, the AI 1440 traces following messages and performs morpheme analysis and transcription analysis.

The AI 1440 initializes the message counter prior to the tracking analysis of the subsequent message following the message B2. Then, the AI 1440 performs morpheme analysis and speech act analysis on the subsequent message A3 (i=1) following the message B2 through the speech act analysis module 1441. Message A3 is a morpheme continuum containing "too early", which implies impermissibility, so the speech act analysis determines that the purpose of the message A3 is notification of refusal of the proposed time 7:30 am. In other words, it is determined that message A3 is neither an agreement on the proposal of the message B2 nor an alternative presentation. Thus, the AI 1440 increments the message counter value by one and compares it with the maximum iteration count of five. Since the increased message counter value 2 is less than the maximum number of iterations 5, the AI agent 1440 performs the morpheme analysis and the speech act analysis on the message B3 (i=2) following the message A3. This is because, as described above, an alternative may be proposed by the user of the mobile terminal or the friend 1 even after the rejection of the message A3. At this time, since the message A3 has no contents to change the items included in the temporarily stored schedule information, the schedule information is not updated.

Message B3 is a morpheme continuum containing "then", which is adverb meaning addition, "12:15 pm", which indicates a specific time, and question mark "?". The speech act analysis module 1441 determines, based on the arrangement of the morphemes, that the message B3 corresponds to the presentation of a new alternative, and that the new alternative is '12:15 pm (next Friday)'. That is, the artificial intelligence agent 1440 determines that the message B3 is to propose a new alternative as a response to the message A3.

Meanwhile, since message B3 includes '12:15 pm (next Friday)' which is an alternative time proposed in message B2, the temporarily stored schedule information should be updated. The artificial intelligence agent 1440 updates the temporarily stored schedule information as follows.

[2017.4.7, 12:15]_[Golf]_[Korea Country Club]_[Friends 1]_[ ]

The artificial intelligence agent 1440 holds confirmation of the schedule and continues tracing messages and morpheme/speech act analysis on the following message until the response of the friend 1 to the new proposal is detected.

At this time, since the routine for tracking consent regarding the alternative is newly started, the artificial intelligence agent 1440 initializes the message counter and performs morpheme analysis on the message A4 (i=1) following the message B3. The message A4 contains the positive morpheme "perfect" and exclamation mart "!!!". The speech act analysis module recognizes that the message A4 is for conveying consent to the preceding message B3 based on the meaning of the morphemes included in the message A4 and the connection relationship. Therefore, the artificial intelligence agent 1440 interprets that the date and time proposed by the message B3, i.e., '12:15 PM next Friday' is confirmed, and performs processing for registering the temporarily stored schedule information.

The schedule information registration process is performed through the above-described process.

Figure 12:
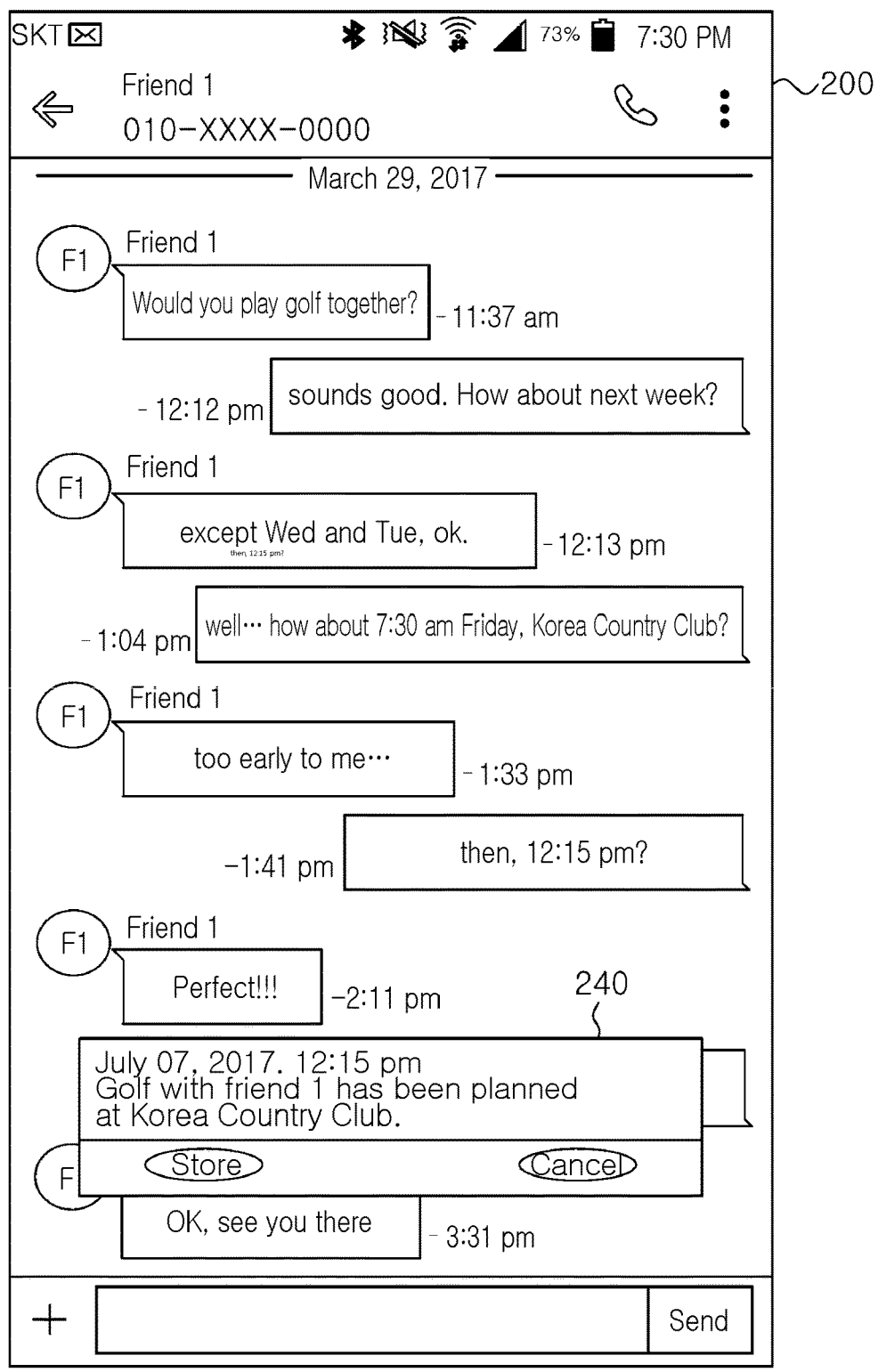
FIG. 12 is a screen shot showing an example of a schedule information registration graphical user interface capable of receiving a user input for approval and rejection of registering schedule information.

FIG. 12 is a screen shot showing an example of a schedule information registration graphical user interface capable of receiving a user input for approval and rejection of registering schedule information.

Referring to FIG. 12, a schedule information registration graphical user interface 240 is provided on the second message management user interface 200. The schedule information registration graphical user interface includes a schedule information creation notification window 241, a registration button 242, and a cancel button 243.

The service response generation module 1443 of the artificial intelligence agent 1440 generates a sentence "An appointment of playing golf with friend 1 at Korea country club at 12:15 pm April 7 is made. Do you register the schedule?" using the generated schedule information, transmits the sentence to the user interface managing unit 1430, and requests for generation of the schedule information registration graphical user interface.

The user interface managing unit 1430 inserts the sentence received from the AI 1440 into the schedule information creation notification window 241 and displays the schedule information registration graphical user interface 240 including the registration button 242 and the cancel button 243 on the second message management user interface 200.

As described above, the artificial intelligence agent 1440 according to the present invention is configured to track a series of conversations and perform morpheme analysis and speech act analysis on each message constituting the conversation, thereby grasping specific contents.

Meanwhile, according to an embodiment of the present invention, the AI 1440 may be configured to determine whether a place presents in the confirmed schedule information, and to provide information about a place if no place is presented. For example, in case that a schedule is confirmed through the processes of FIG. 10, the service response generation module 1443 of the artificial intelligence agent 1440 inquires the confirmed schedule information to determine whether the confirmed schedule includes place item, and, if the confirmed schedule information has no place, searches for adequate places related to the task and provide the search result. At this time, the service response generation module of the artificial intelligence agent 1440 may be configured to search for a place using the location information of the user. For example, the service response generation module may be configured to receive the location information of the user and retrieve the relevant places at a predetermined distance from the location of the user. Also, the service response generation module may search the places by analyzing the contents of the messages tracked and analyzed in the schedule information determination process.

<Event Panel>

According to an exemplary embodiment of the present invention, the integrated message management part 1400 may be further configured to visualize the schedule information, which is created by the AI agent 1440, and to provide the visualized schedule information through the first and second message management user interface 100 and 200.

According to an exemplary embodiment of the present invention, first message management user interface 100 may further include a first event panel 150 for displaying user schedule information created by the AI agent 1440.

Figure 13:
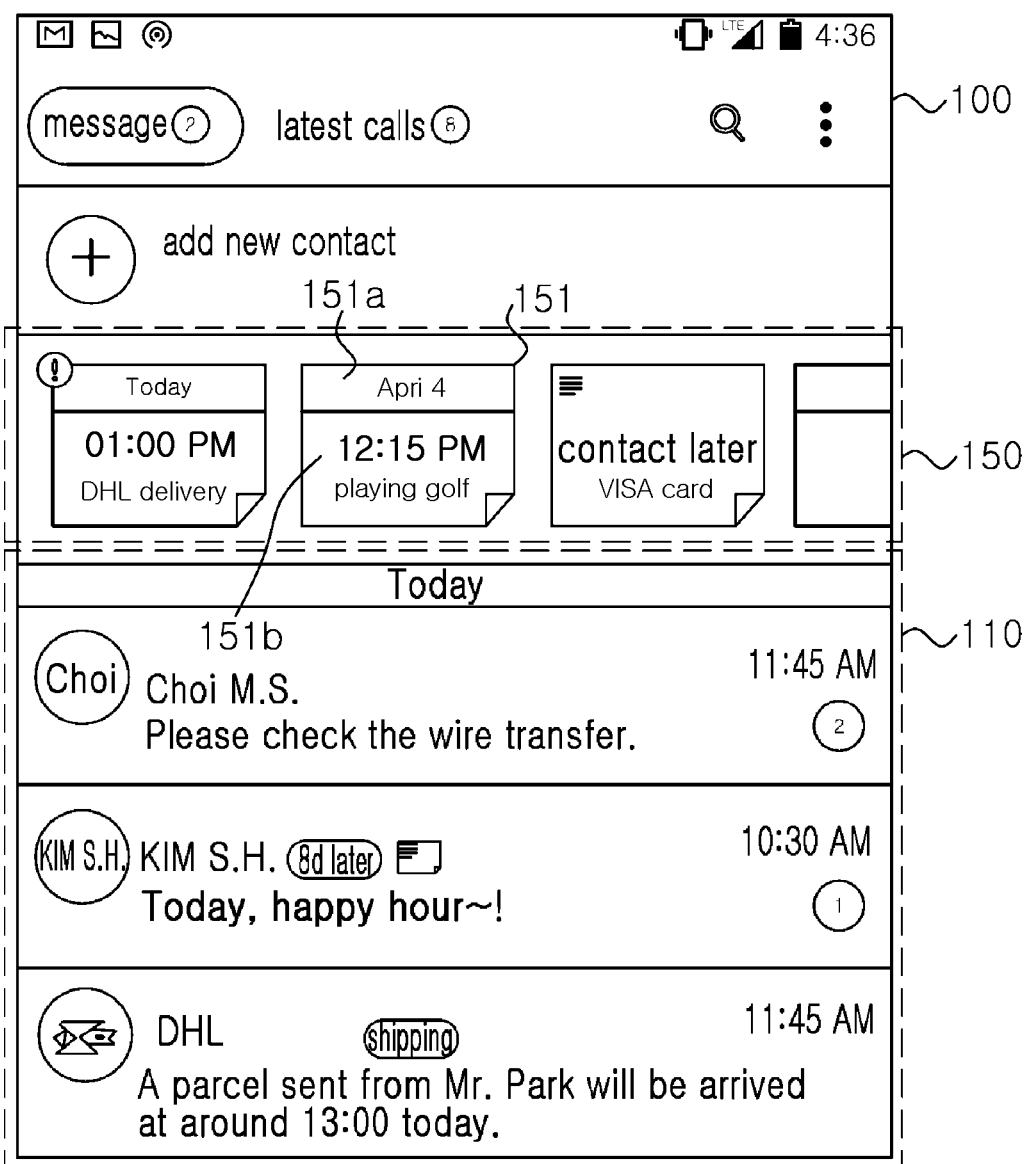
FIG. 13 is an exemplary screenshot of a first message management user interface 100 where a first event panel is displayed.
Figure 14:
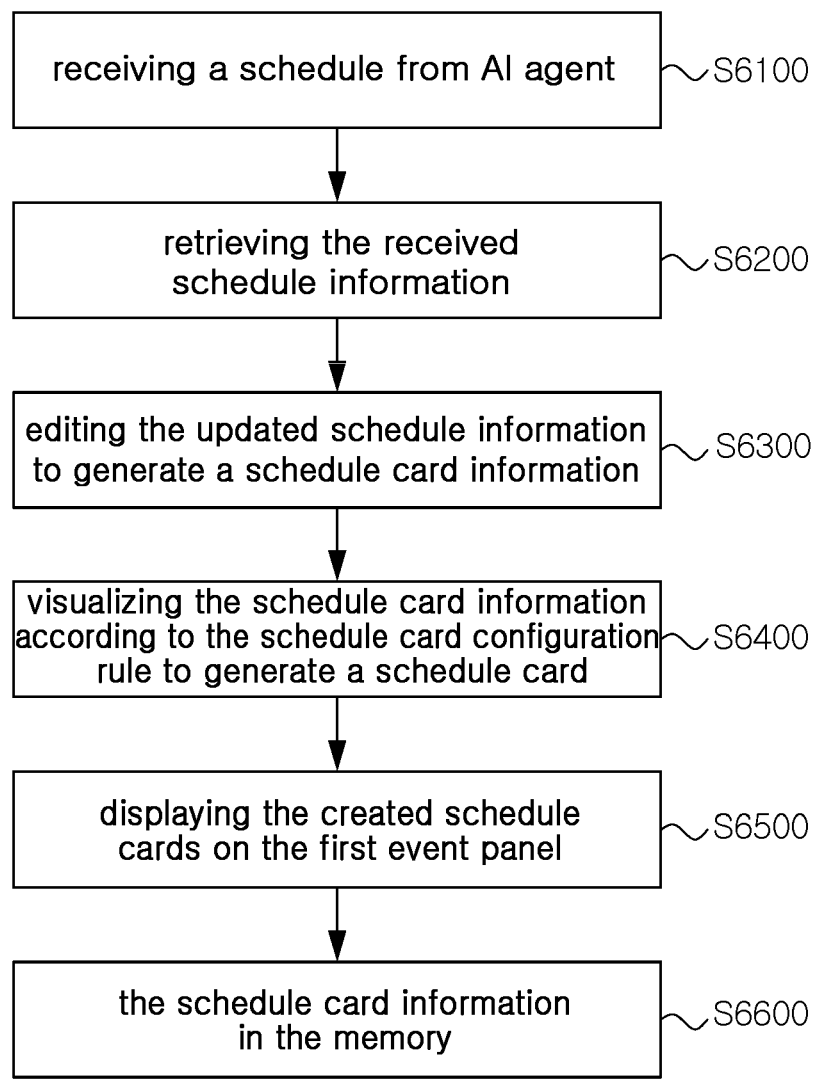
FIG. 14 is a flowchart illustrating a process for generating a first event panel according to an exemplary embodiment of the present invention.

FIG. 13 is an exemplary screenshot of a first message management user interface 100 where a first event panel is displayed, and FIG. 14 is a flowchart illustrating processes for providing a first event panel according to an exemplary embodiment of the present invention.

Referring to FIG. 13, the first message management user interface 100 may include a first event panel 150 that displays information related to a user's schedule as a graphic object, such as a form of a card. The first event panel 150 is provided in the upper area of the first message management user interface 100, and the first event panel 150 includes a plurality of schedule cards 151, each of which displays information on a schedule.

In order to provide the first event panel 150, the integrated message management part 1400 may be configured to receive the user schedule information from the AI agent 1440, and to reconstruct the received schedule information into a predetermined format. For example, the schedule information of a user may include entries, such as a start date and time, an end date and time of a scheduled task, a place, a related person, and description of the schedule. The integrated message management part 1400 may be configured to generate summary information only for some of these entries.

Referring to FIG. 14, in step S6100, the user interface managing unit 1430 receives schedule information created by the AI agent 1440. The schedule information receiving process of step S6100 of the user interface managing unit 1430 may be performed at the time when the first message management user interface 100 is activated or in real-time (e.g., immediately after schedule information is generated by the AI agent 1440).

If an update of the schedule information is received in the schedule information update inquiry step S6100, in step S6200, the message information managing unit 1420 retrieves the received schedule information, and in step S6300, edits the received schedule information according to the schedule card information format. The schedule card information format defines entries to be displayed on a schedule card and notation of entries. For example, the schedule card information format specifies the date in the form of "MM.DD.", time in the form of "hh:mm AM (or PM)", and headline in the form of full text of the title of the schedule, as display entries. In this case, the message information managing unit 1420 extracts only the entries defined by the schedule card information format from the schedule information, and edits the entries according to the display format defined in the schedule card information format to generate the schedule card information.

In the above description, the generation of the schedule card information is performed by the message information managing unit 1420. However, the inventive concepts are not limited thereto, and all or a part of such processes may be performed by the user interface managing unit 1430.

Then, in step S6400, the user interface managing unit 1430 visualizes the schedule card information according to the schedule card configuration rule to generate a schedule card. In step S6500, the user interface managing unit 1430 arranges and displays the created schedule cards on the first event panel 150 according to a schedule card configuration rule. The schedule card configuration rule regulates display form of the schedule card information. For example, the schedule card configuration rules may be defined as follows: 1) the schedule card information is displayed on a card-shaped image divided into a small block at the top and a large block at the bottom; 2) the date is displayed in a small block, and time and title are placed in the large block; 3) the scheduled time is displayed using a large font; and 4) the title is displayed using a small font under the time. The user interface managing unit 1430 processes and visualizes each entry of schedule card information according to the configuration rule as described above, and displays the result on the first event panel 150 of the first message management user interface 100.

The schedule card may include a link for access to details of the schedule information. In response to a user input, such as touching a certain schedule card, the user interface managing unit 1430 accesses a schedule management application to retrieve detailed schedule information corresponding to the selected schedule card, and displays the detailed schedule information on the mobile terminal 10.

Referring to FIG. 13, in the first event panel 150, a schedule card 151 generated according to a schedule card information format and a schedule card configuration rule is displayed. In the example of FIG. 13, according to the above-exemplified schedule card information format and the schedule card configuration rule, the date "April 4" is inserted into the upper small block 151a, the time "12:15 PM" is displayed in the lower large block 151b using large fonts, and the title "playing golf" is displayed under the time "12:15 PM" in the lower large block using small fonts.

In step S6600, the schedule card information generated by the message information managing unit 1420 may be stored in the memory 1500. The process of storing the schedule card information at step S6600 may be performed simultaneously with the schedule card generating process S6400 or the displaying process S5500 of the schedule card, or independently.

The schedule card information format and the schedule card configuration rule may be changed according to the user setting. That is, the user can change at least one of the entries and the display format of the schedule information card. The processes for reconstructing the schedule card according to the change of schedule card information format and the schedule card configuration rule may be performed in a substantially similar manner to the above described reconstruction process for the message block 111 and 112 according to changing the integrated message block format.

The plurality of schedule cards 151 displayed on the first event panel 150 may be arranged based on time included in the schedule information. That is, the user interface managing unit 1430 may arrange the schedule card 151 so that the most up-to-date schedule is placed at the front-most of the first event panel 150. The first event panel 150 may be configured to explore schedule cards 151 in response to a user input, such as sweeping or scrolling the currently displayed schedule cards 151.

The schedule card 151 may be generated so as to be identifiable from each other based on the attributes of the schedule. For example, the schedule information may include information indicating the importance of the schedule. In this case, the user interface managing unit 1430 may be configured to set the color of the card or the color of the characters differently based on the degree of importance. Such a configuration may be defined in a schedule card configuration rule.

Meanwhile, the second message management user interface 200 may include a second event panel 250 displaying schedule information created by the AI agent 1440.

Figure 15:
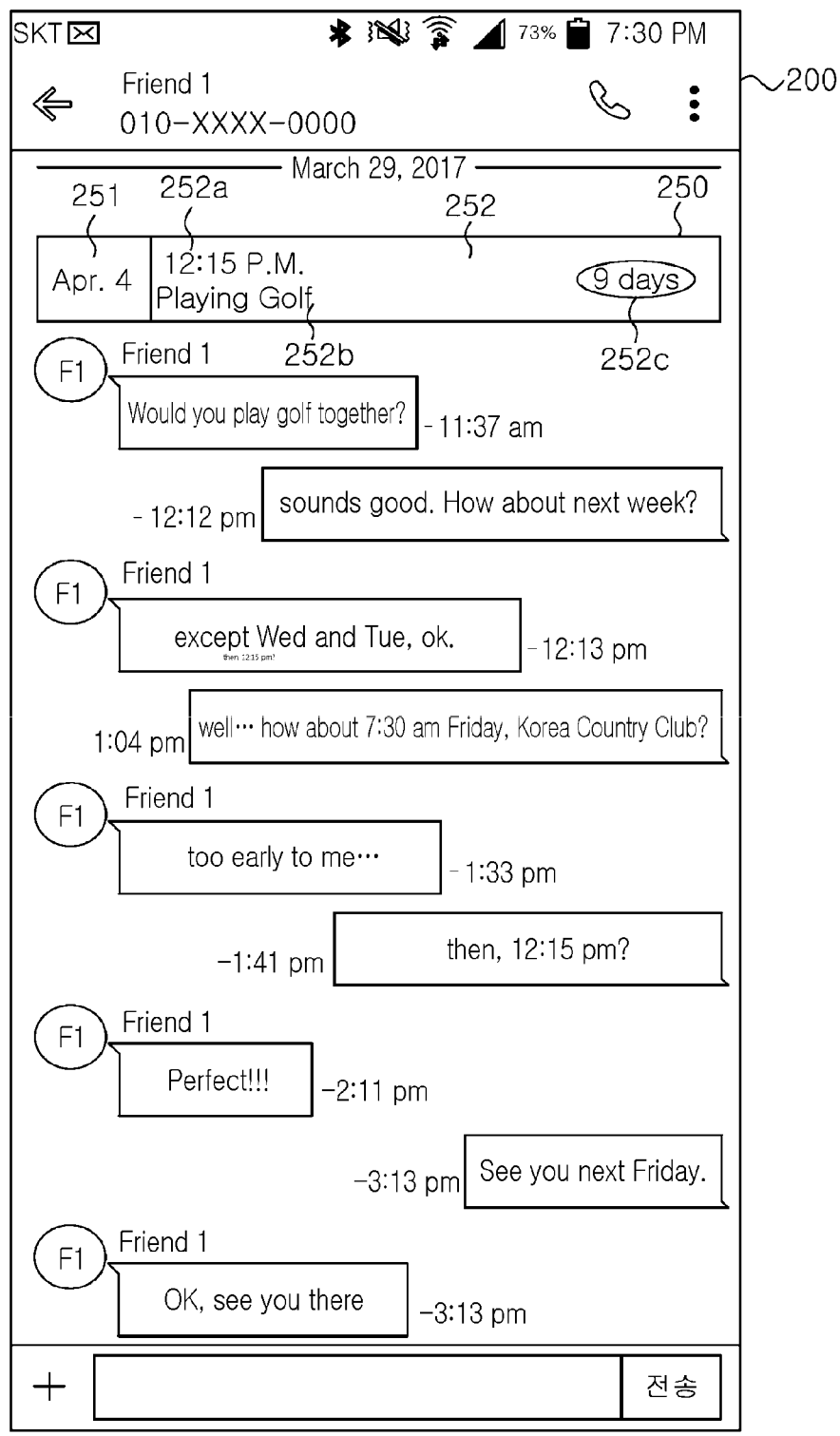
FIG. 15 is a flowchart illustrating a process for generating a first event panel according to an exemplary embodiment of the present invention.
Figure 16:
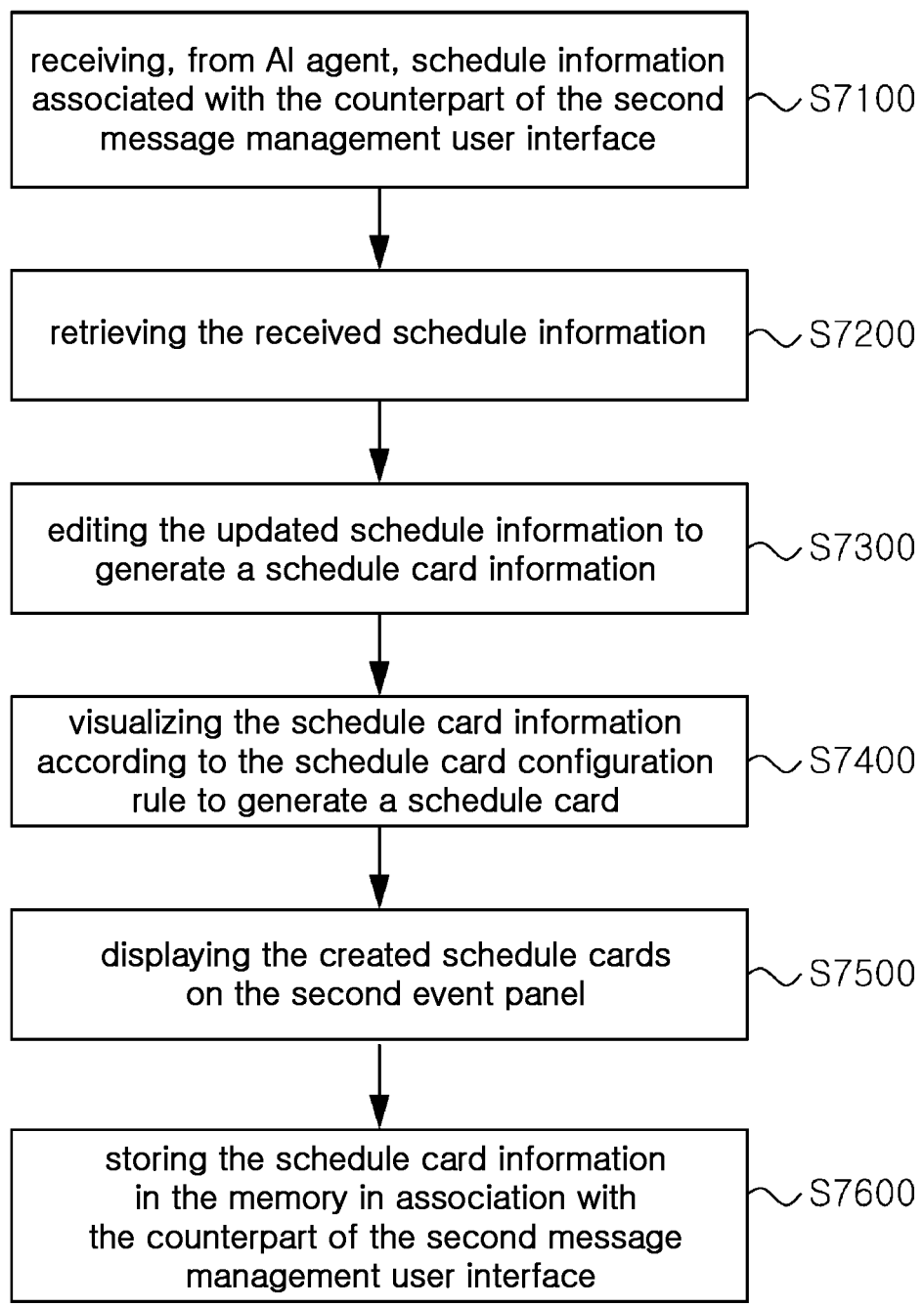
FIG. 16 is a flowchart showing processes for generating an authentication code copy interface.

FIG. 15 is an exemplary screenshot of a second message management user interface 200 where a second event panel is displayed, and FIG. 16 is a flowchart illustrating processes for providing a second event panel according to an exemplary embodiment of the present invention.

In the embodiment of FIG. 15, the second event panel 250 may be configured to display only the earliest arriving schedule among the schedule associated with the counterpart of the second message management user interface 200.

Referring to FIG. 16, in step S7100, the user interface managing unit 1430 receives schedule information that is created by the AI agent 1440 in associated with the counterpart of the second message management user interface 200. Here, the counterpart refers to the other party of the conversations (voice calls and text messages) displayed on the second message management user interface 200. The schedule information associated with the counterpart refers to schedule information created by the AI agent 1440 based on conversations with the counterpart. The schedule information receiving step S7100 may be performed at the activation of the second message management user interface 200 or may be performed in real-time (e.g., immediately after schedule information is generated by AI agent 1440).

In step S7200, the message information managing unit 1420 retrieves the earliest coming schedule from the received schedules, and in step S7300, generates second event panel information according to the second event panel information format. The second event panel information format defines entries to be displayed on a second event panel 250 and notation of entries. For example, in the second event panel information format, a scheduled date in the form of "MM. DD", scheduled time in the form of "hh:mm AM (or PM)", a headline in the form of full text or title of the schedule, and remaining time until scheduled time in the form of "n days later", "n hours later", or "n minutes later" are specified as display entries. In this case, the message information managing unit 1420 extracts only the entry defined by the second event panel information format from the schedule information, and edits it according to the second event panel information format to generate the second event panel information.

In the above description, the generation of the second event panel information is described as being performed by the message information managing unit 1420. However, the inventive concepts are not limited thereto, and all or a part of such processes may be performed by the user interface managing unit 1430.

Then, in step S7400, the user interface managing unit 1430 visualizes the second event panel information according to a predetermined rule to generate a second event panel 250 including the visualized second event panel information, and in step S5520, displays the second event panel 250 on the message management user interface 200. The second event panel configuration rule may define display form of the second event panel information generated by the message information managing unit 1420. For example, the second event panel configuration rule may define whether: 1) the second event panel information is displayed on a card-shaped image (schedule card) divided into a small block and a large block in the horizontal direction; 2) the scheduled date is displayed in the left small block, and the scheduled time, and the headline and the remaining time are displayed on the right large block; 3) the scheduled time is displayed using large fonts; 4) headline is displayed under the scheduled time using small fonts; and 5) the remaining time is inserted into an elliptical image located at the upper right of the large block. The user interface managing unit 1430 processes and visualizes each entry of the second event panel information according to the above-described configuration rule, and displays the generated second event panel on the second message management user interface 200.

Referring back to FIG. 15, in the second message management user interface 200, a second event panel 250 generated according to the above-described second event panel information format and the second event panel configuration rule is displayed.

The second event panel 250 displays schedule card created according to the second event panel information format and the second event panel configuration rule. In the example of FIG. 15, according to the above-described second event panel information format and second event panel configuration rule, the scheduled date "April 07" is inserted into the left small block 251, the scheduled time "12:15 PM" 252*a* is displayed on the left side of the right large block 252 using large fonts, the headline entry "Playing Golf" 252*b* is placed below the scheduled time 252*a* in the large block 252, and the remaining time "9 days later" 252*c* is displayed into an elliptical image at the upper right of the large block 252.

In step S7600, the second event panel information generated by the message information managing unit 1420 or the second event panel generated by the user interface managing unit 1430 may be stored in the memory 1500 in association with the counterpart of the second message management user interface 200. The process of storing the second event panel information at step S7600 may be performed at the same time as the generation process of the second event panel S7400 or the display process of the second event panel S7500, or independently.

The user may select a schedule card displayed on the event panel through a user input (for example, touch input) to see detailed information of the corresponding schedule, or to perform additional operations, such as modification or deletion. In other words, the interface managing unit may be configured to receive the user selection of a schedule card, and activate a schedule information management application for providing detailed information on the selected schedule.

The user can transmit the schedule card displayed in the above-described event panel to other service subscribers. That is, the user can select one of the schedule card provided in the event panel, and transmit the selected card to a mobile terminal 10 of another user subscribed to the integrated message management service.

<Authentication Code Copying>

In online financial transactions and electronic commerce, a one-time authentication code is often used as a means of identity verification, which is generated by a certification authority and transmitted to a user in a form of a text message. Conventionally, when a text message including an authentication code is received from a certification authority, the user opens a text message, memorizes the authentication code, and input the code manually.

Meanwhile, the integrated message management part 1400 may be configured to provide a user interface that automatically copies the authentication code from the received message containing the authentication code sent from the certification authority.

Hereinafter, the configuration and operation of the AI agent 1440 and user interface managing unit 1430 associated with the authentication code copy interface will be described in detail.

Figure 17:
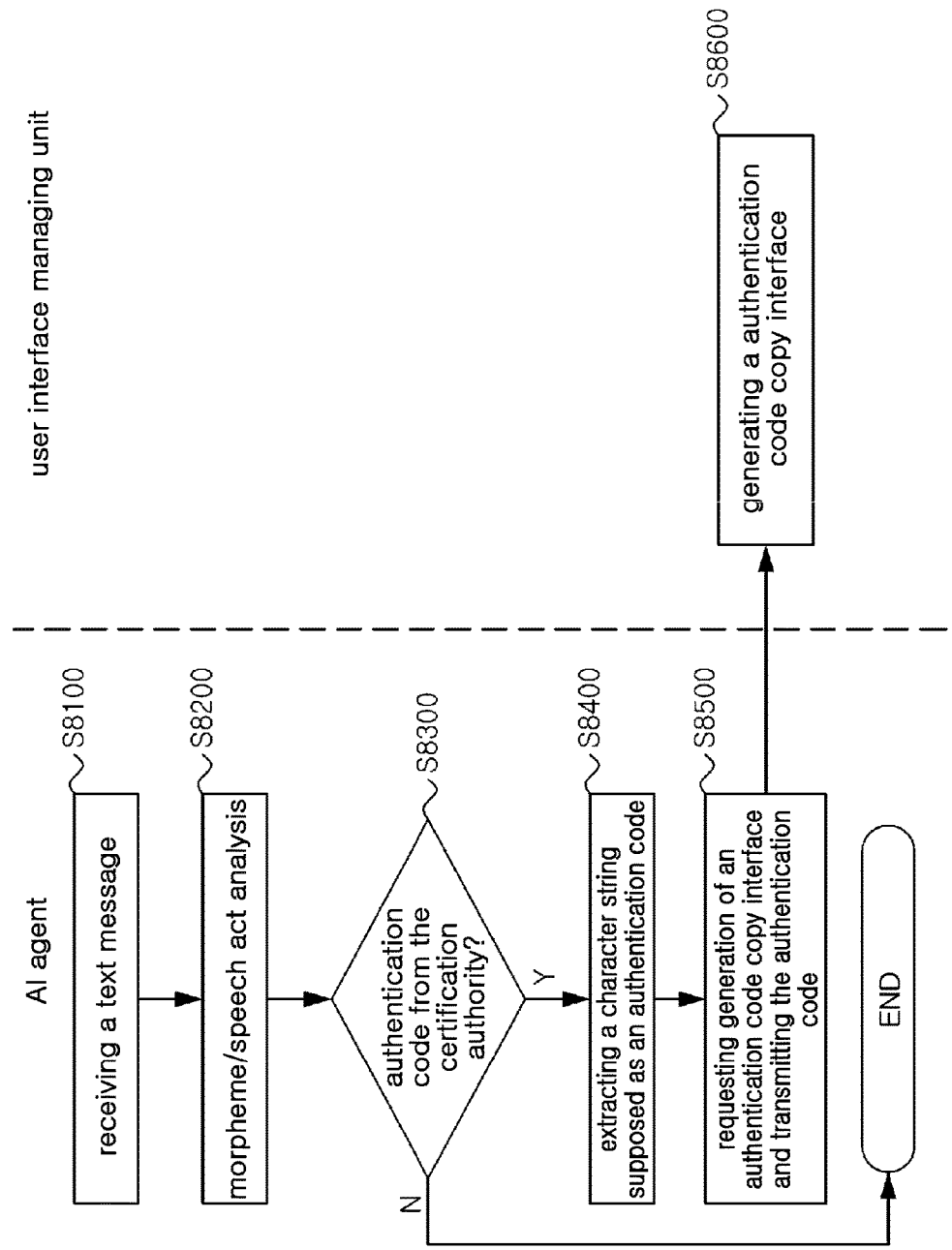
FIG. 17 is a flowchart illustrating a process for generating an authentication code copy interface.

FIG. 16 is a flowchart showing processes for generating an authentication code copy interface, and FIG. 17 is a screenshot showing an example of the authentication code copy interface.

Referring to FIG. 16, first, the AI agent 1440 receives a text message S8100. The speech act analysis module 1441 of the AI agent 1440 performs morpheme analysis and speech act analysis on the received message S8200. Then, the AI agent 1440 determines whether the received message has a purpose of delivery of an authentication code S8300. For example, the user interface managing unit 1430 may be configured to determine whether a received message includes words, such as "authentication number (code)", "personal identification number (code)", and "password" and provide a user interface for copying the authentication code.

When the received message is determined as a message for delivery of an authentication code, the AI agent 1440 extracts the authentication code from the message S8400.

Since the authentication code is usually composed of random numeric strings or character strings, the user interface managing unit 1430 may be configured to find and extract random numeric strings or strings from among the text messages.

Then, the AI agent 1440 transmits to the user interface managing unit 1430 the extracted authentication code with a request for generating an authentication code copy user interface S8500.

In step S8600, the user interface managing unit 1430 create an authentication code copy interface, inserts the received character string into the authentication code copy interface, and displays the authentication code copy interface on the mobile terminal 10.

Figure 18:
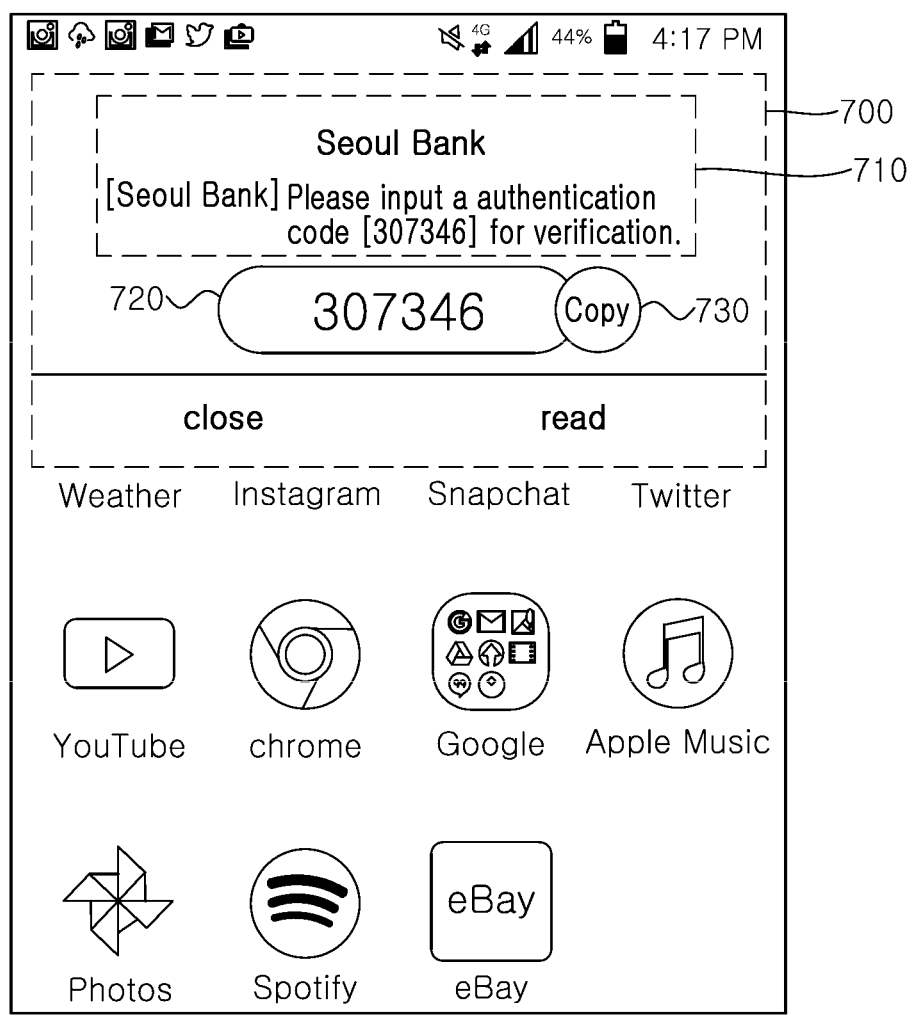
FIG. 18 is a screenshot illustrating an example of the authentication code copy interface provided by the present invention.

FIG. 18 is a screenshot showing an example of the authentication code copy interface.

Referring to FIG. 18, the received authentication code message is displayed on a card-shaped authentication code copy interface 700. The authentication code copy interface 700 may be displayed on the mobile terminal 10 without activating the text message application. At this time, the above-described steps S8100 to S8600 are performed upon receipt of the text message. The authentication number copy interface 700 includes a text message display window 710, an authentication code display window 720, and a copy GUI 730. The text message display window 710 displays the sender and the contents of the text message. The authentication code display window 720 displays the authentication code extracted from the text message. The copy GUI 730 may be used to receive a user input of copying the authentication code displayed in the authentication code display window 720. The user can simply copy the authentication code through a user input (e.g., touching the copy GUI 730). The "close" button and "read" button are provided at the bottom of the copy GUI 730. When the user selects "close", the card then disappears. When the user selects "read", the user interface managing unit 1430 accesses the text message information managing unit 1420, and displays the original received message on the mobile terminal 10. In addition, the user interface managing unit 1430 may be configured to automatically close the card when the user selects the copy GUI 730 to complete copying the authentication code. In FIG. 17, "307346" included in the text message is extracted as the authentication code.

In this manner, the user can copy the authentication code using the authentication code copy interface 700 and paste it into a desired place. Therefore, the user convenience is much improved compared to the conventional method, which requires troublesome user actions such as reading a text message, searching for a necessary authentication code, and memorizing the code to manually input the code into a desired place.

<Generating an Absence Response Message>

If the user fails to answer an incoming voice call, a message indicating that the user is absent is sent to the calling party. Such conventional absence response message may be sent by a mobile communication carrier or directly from a user's mobile terminal. However, since such an absence response message repeatedly uses a predetermined phrase, the intimacy with the calling party is not considered at all.

According to one embodiment of the present invention, upon failure of answering an incoming voice call, the AI agent 1440 may be configured to selects tone of messages based on the conversation history analysis with the calling party.

When failure to answer an incoming voice call is detected, the AI agent 1440 receives the voice call information of the missed voice call from the voice call management part 1100.

The artificial intelligence agent 1440 identifies the calling party from the received voice call information, and analyzes the conversation history between the identified calling party and the user to determine the level of tone used for the response. The determination of the tone level may be performed based on the morpheme analysis result of the messages sent by the user to the calling party. Especially in case of Korean, the sentence ending of the messages are an important criterion for determining the level of respect.

For example, if a voice call is received from 'buddy 1' who is the conversation partner in FIG. 11 but does not respond, the AI 1440 receives information about the missed incoming voice call from the voice call management part 1100. The AI agent 1440 recognizes that the sender of the incoming voice call is 'friend 1' based on the received voice call information. The artificial intelligence agent 1440 searches and analyzes the conversation history with 'friend 1' to create a response message for the missed voice call. As shown in FIG. 11, since any honorific titles is not used at all in the messages sent by the user to 'Friend 1' and tone is usually informal, the artificial intelligence agent 1440 generates and transmits a response message without honorific titles, for example, "call later".

The response message is generated through the speech act generation function of the service response generation module 1443. The response message is created based on the conversation data collected by the server. That is, the service response generation module 1443 may combine tagged corpus, which is the result of analyzing the collected conversation data, to generate a response to the missed call.

One embodiment of the present invention may provide a computer-readable storage medium including instructions for a processor mounted on a mobile terminal 10 to perform the processes described above. As described above, the integrated message management part 1400 according to the present invention may be combination of a processor embedded in the mobile terminal 10 and an application executed in the processor. The application may be downloaded from the integrated message management service server 20 and installed in the memory 1500. The application includes a plurality of instructions for causing the processor to perform all processing for providing additional functions by the integrated information management and message intelligence agent according to the present invention <The Integrated Message Management Server>

Figure 19:
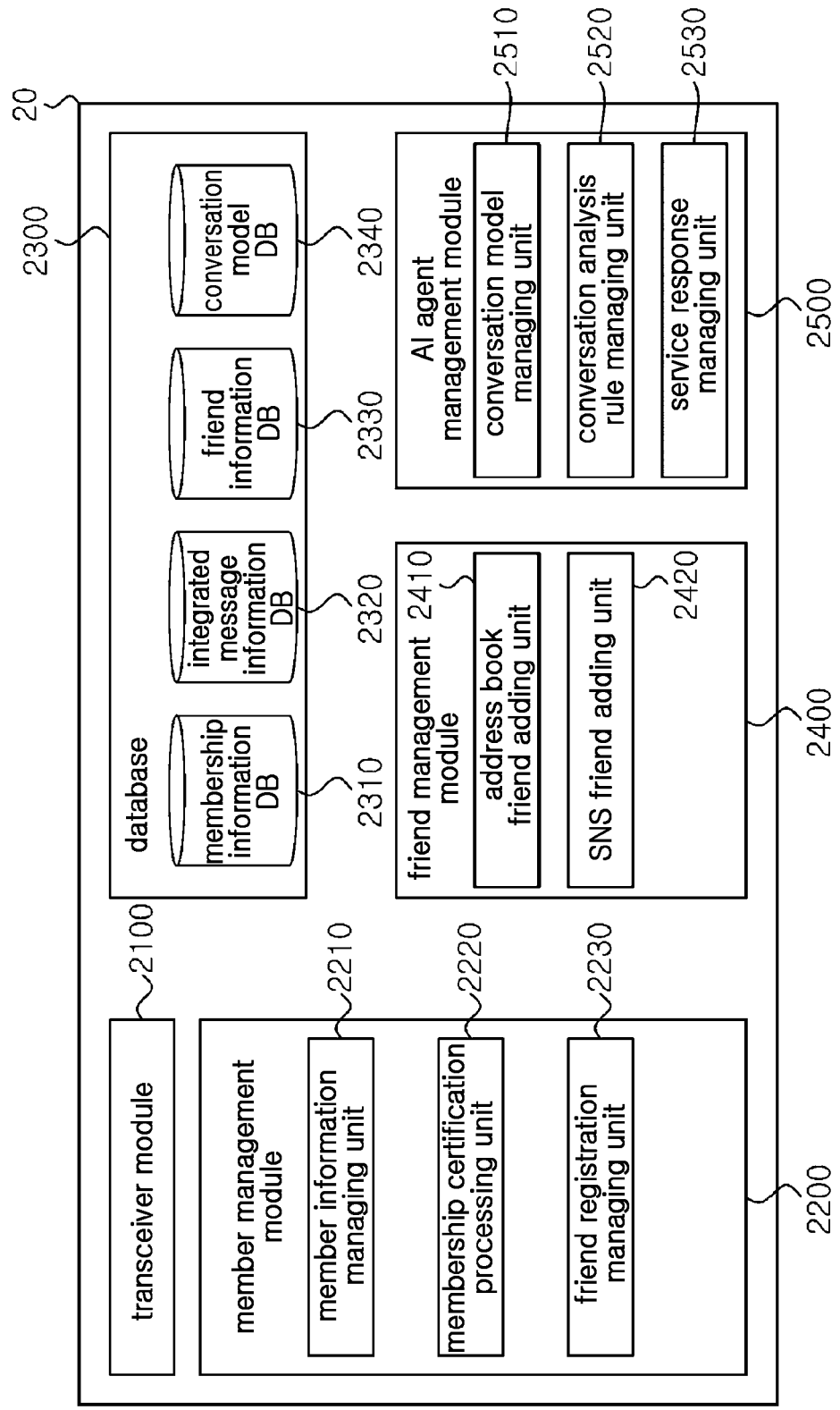
FIG. 19 is a block diagram illustrating an integrated message management service server configured according to a first system configuration according to an exemplary embodiment of the present invention.

FIG. 19 is a block diagram showing a configuration of the integrated message management service server 20 having a first system configuration according to an exemplary embodiment of the present invention.

The integrated message management service server 20 having the first system configuration according to an exemplary embodiment may include a data transceiver module 2100, a member management module 2200, a database 2300, a friend management module 2400, and a AI agent management module 2500.

The data transceiver module 2100 receives information generated in association with the integrated message information management application (e.g., integrated message information, schedule information, memo information, and the like) from the user's mobile terminal 10, and transmits the information managed by the integrated message management service server 20 to the mobile terminal 10.

The member management module 2200 may include a member information managing part 2210, a membership authentication part 2220, and a friend registration managing part 2230. The member information managing part 2210 stores various member related information, which is obtained when each user subscribes to a service or a database, and updates of changes to the membership-related information.

The membership authentication part 2220 performs authentication in cooperation with an authentication server (not shown), when a user accesses the integrated message management service server 20. In addition, when the user who does not subscribe to the integrated message management service accesses the integrated message management service server 20, the membership authentication part 2220 may provide the above-described integrated message information management application to the mobile terminal of the user (e.g., providing a link to download and install the integrated message information management application, or automatically providing the application).

The friend registration managing part 2230 manages integrated message management service to a friend, who is registered as a friend in various methods for each member.

The friend management module 2400 may include an address book friend managing part 2410 and an SNS friend managing part 2420 to perform functions described above. The address book friend managing part 2410 searches the address book stored in the client terminal 10, and automatically registers the searched friend in the address book as an the integrated message management service friend. The SNS friend managing part 2420 searches the SNS friend registered by himself/herself in the SNS service (e.g., 'Facebook' or 'Kakao Talk' service), and automatically registers the searched SNS friend as an the integrated message management service friend. As described above, the friend management module 2400 provides a function of registering an acquaintance as an integrated message management service friend of in various ways.

For example, when an integrated message management service application installed in the client terminal 10 is executed, the client application directly reads the address book data stored in the client terminal 10, and transmits the address book data to the service server 20. Then, the integrated message management service server 20 inquires the member information stored in the member information database to determine whether each contact in the address book data has been registered as a member of the integrated message management service, and then transmits the determination results to the client terminal 10 such that the client terminal 10 may perform an integrated message management service friend registration.

The database 2300 for storing various data may include a membership information database 2310, an integrated message information database 2320, a friend information database 2330, conversation model database 2340, and other database necessary for providing the integrated message management service.

The membership information database 2310 stores various information of members who subscribe to the integrated message information management service. For example, the member information may include personal information, a profile photograph, the nickname, the latest access time, the SNS subscription information, the personal information exposure setting information, and the login setting information.

The integrated message information database 2320 stores the integrated message information generated through the integrated message information management application of the mobile terminal 10.

The friend information database 2330 stores various kinds of information on integrated message management service friends registered automatically or by a member. For example, the information may include ID and nickname of registered friends, registration path information, friend blocking information, and the like.

The conversation model database 2340 stores data related to the conversation model described above.

The artificial intelligence agent management module 2500 may include a conversation model management unit 2510, a conversation analysis rule management unit 2520, and a service response managing unit 2530.

The conversation model management unit 2510 manages the conversation model used for generating the service response generation rule and analysis rule of the AI agent 1440. The conversation model management unit 2510 collects conversation data through the integrated message management platform according to the present invention, analyzes the collected data, and reflects the collected data to the generated conversation model.

The conversation analysis rule managing unit 2520 performs a function of updating or creating the dialog analysis rule based on the dialog model generated or updated by the conversation model managing unit 2510. The conversation analysis rule management unit 2520 also performs a function of transmitting the updated or added analysis rule to the user's mobile terminal 10. That is, the analysis rule of the AI agent 1440 installed in the user's mobile terminal 10 is updated by the conversation analysis rule management unit 2520 of the server 20.

The service response managing unit 2530 manages a service response performed by the AI agent 1440 of the user's mobile terminal 10. Specifically, the service response managing unit 2530 performs a function of creating and changing a service response rule, and transmitting the changed/generated service response rule to the user's mobile terminal 10.

According to an exemplary embodiment, the integrated message management service server 20 may have a second system configuration. In the first system configuration, most functions related to the integrated message management service, such as generation and management of integrated message information, processing of additional functions, and management of user interface are performed in the user mobile terminal 10, and the server 20 stores the processed result data and retrieves the stored data in response to a request from the mobile terminal 10.

On the other hand, the integrated message management service server 20 having the second system configuration according to an exemplary embodiment may be configured to provide a part of above-described various functions performed in the integrated message management part 1400 of the user mobile terminal 10 in the first system configuration. That is, some of the components of the integrated message management part 1400 of the user mobile terminal 10 of the first system configuration may be included in the integrated message management service server 20 having the second system configuration, and the corresponding functions may be performed by the integrated message management service server 20 without involvement of the user mobile terminal 10.

Figure 20:
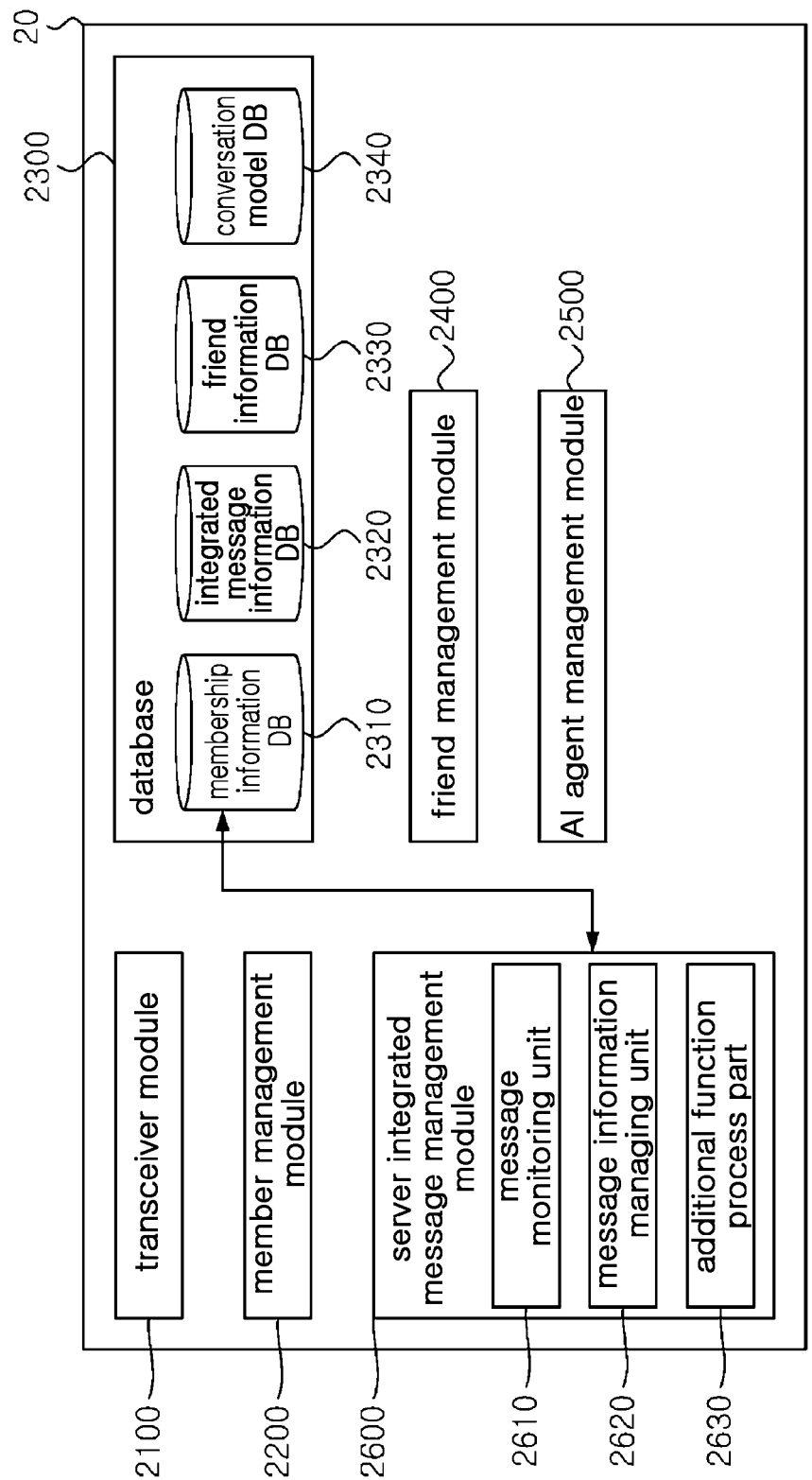
FIG. 20 is a block diagram illustrating an integrated message management service server configured according to the second system configuration according to an exemplary embodiment of the present invention.
Figure 21:
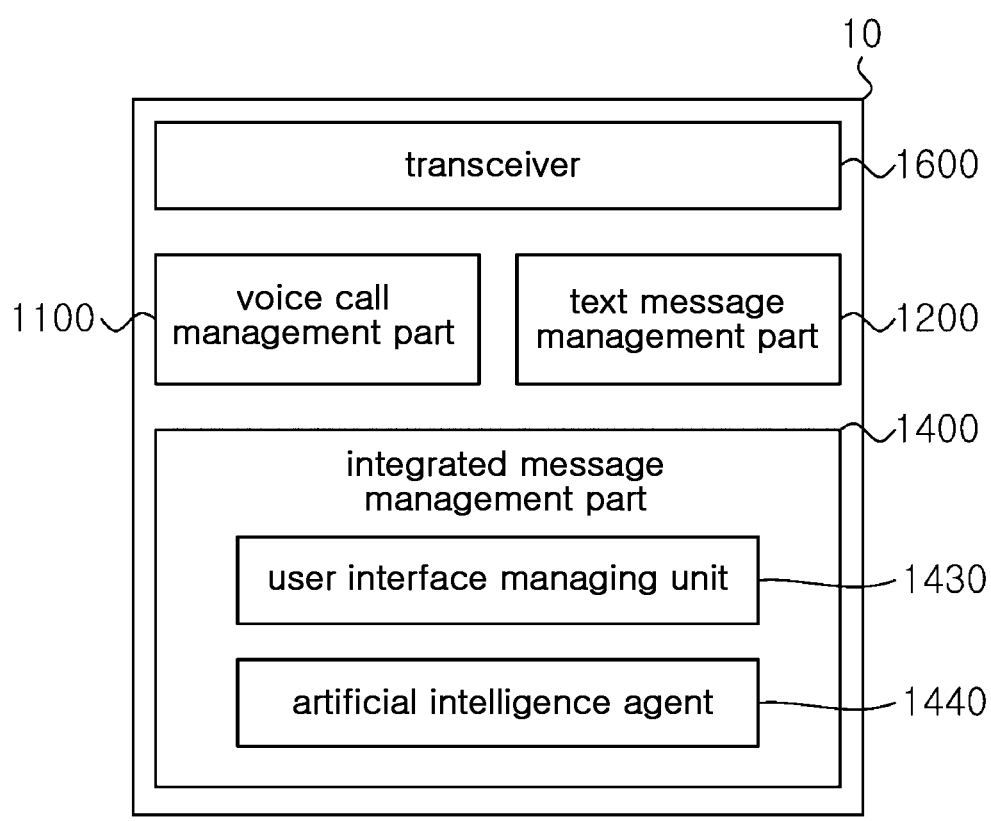
FIG. 21 is a block diagram illustrating a mobile terminal configured according to a second system configuration according to an exemplary embodiment of the present invention.

FIGS. 20 and 21 are block diagrams showing an integrated message management service server and a user mobile terminal having the second system configuration according to exemplary embodiments.

Referring to FIG. 21, a user mobile terminal 10 includes a voice call management part 1100, a text message management part 1200, an integrated message management part 1400, and a transceiver 1600. The integrated message management part 1400 includes a user interface managing unit 1430, and an artificial intelligence agent 1440. Meanwhile, referring to FIG. 20, the integrated message management service server 20 further includes a server integrated message management module 2600 including a message monitoring unit 2610, a message information managing unit 2620, and an additional function process part 2630 in addition to the components of the integrated message management service server 20 having the first system configuration shown in FIG. 19.

Among the components of the user mobile terminal 10 of FIG. 21, the same components as those of the first system configuration perform the same functions as the first system configuration. Therefore, duplicated description of the same functions and operations will be omitted. However, since some operations is necessary to be performed in association with the integrated message management service server 20 having the second system configuration, those will be described again. Similarly, with respect to the integrated message management service server 20, only the operations performed in connection with the user mobile terminal 10 will be described, and the same components as those in the first system configuration example will be omitted to avoid redundancy.

The message monitoring unit 1410 of the user mobile terminal 10 inquires whether the voice call information and the text message information are updated. The access to the voice call management part 1100 and the text message management part 1200, and the inquiry about the update of the voice call information and the text message information are performed in substantially the same manner as those described in the first system configuration. As a result of the inquiry, if there are newly received/transmitted voice call information and text message information, the message monitoring unit 1410 transmits the corresponding voice call information and the text message information to the integrated message management service server 20 via the transceiver 1600.

Upon receiving the voice call information and the text message information from the user mobile terminal 10, the message information managing unit 2620 of the integrated message management service server 20 generates integrated message information, which is to be provided for the user through the integrated message management application, to the user mobile terminal 10. The detailed operation of the message information managing unit 2620 is substantially the same as that of the message information managing unit 2620 of the mobile terminal 10 in the first system configuration. In other words, the message information managing unit 260 of the integrated message management service server 20 is configured to perform substantially the same process performed by the message information managing unit 1420 of the mobile terminal 10 in the first system configuration. For example, the message information managing unit 2620 of the integrated message management service server 20 performs a process for generating the integrated message information according to a message block format, which is the same as the step S1300 of FIG. 5.

The integrated message information generated by the message information managing unit 2620 is stored in the integrated message information database 2320. The data transceiver module 2100 of the integrated message management service server 20 transmits the integrated message information to the user mobile terminal 10.

The user interface managing unit 1430 of the user mobile terminal 10 generates the first message management user interface 100 and the second message management user interface 200 using the integrated message information received from the integrated message management service server 20. The details of the operation of the user interface managing unit 1430, the first message management user interface 100, and the second message management user interface 200 are substantially the same as those in the first system configuration. Information on the text message and the voice call newly exchanged through the first and second message management user interfaces 100 and 200 are transmitted to the server 20, and the message information managing unit 2620 of the server 20 processes information on the received text message and voice call, and stores it in the integrated message information database 2320.

The additional function process part 2630 of the integrated message management service server 20 performs substantially the same operation as the additional function process part 1300 of the user mobile terminal 10 in the first system configuration, in response to the user input performed on the first and second message management user interfaces 100 and 200. That is, upon receiving a user request for activating a specific additional function, in which the request is input through the first and second message management user interfaces 100 and 200 provided to the user's mobile terminal 10, the additional function process part 2630 runs a server application performing the requested additional function. The server application provides the user mobile terminal with an additional function user interface capable of receiving user input related to the additional function.

When the user input related to the additional function is inputted through the additional function user interface, the user mobile terminal 10 transmits the inputted user input to the integrated message management service server 20. The additional function process part 2630 of the integrated message management service server 20 performs the process corresponding to the received user input, stores the result in the database, and transmits the result to the user mobile terminal 10. The user interface managing unit 1430 of the user mobile terminal 10 performs substantially the same process as those described in the first system configuration to display the received additional function processing result on the first and second message management user interfaces 100 and 200.

For example, when the user touches the schedule management icon displayed on the first message management user interface 100, the user mobile terminal 10 transmits a signal requesting the schedule management function to the integrated message management service server 20. The integrated message management service server 20 executes the schedule management server application in response to the user request, and provides the user terminal 10 with a schedule management user input interface as shown in FIG. 13 for the mobile terminal 10. The schedule management user input interface may be stored in the user mobile terminal 10 to be provided through the first and second message management user interfaces 100 and 200 when the schedule management server application is executed on the integrated message management service server 20.

When the user inputs necessary information through the schedule management user interface, the user mobile terminal 10 transmits the inputted information to the integrated message management service server 20. The schedule management server application of the integrated message management service server 20 generates schedule information using the received user input information, and transmits the result to the user mobile terminal 10. The user interface managing unit 1430 of the user mobile terminal 10 displays the received schedule information on the first and second message management user interfaces 100 and 200.

The above-described methods and the process flow diagrams are provided as illustrative examples and are not intended to require or imply that the steps of the various exemplary embodiments must be performed in the order presented. Instead, the order of steps in the foregoing exemplary embodiments may be performed in any order.

Words such as "after", "then," "next," etc. are merely intended to aid the reader through description of the methods.

The various illustrative logical blocks, units, modules, circuits, and algorithm steps described in connection with the exemplary embodiments may be implemented as electronic hardware, computer software, or combinations of both. In order to describe the interchangeability of hardware and software, various illustrative features, blocks, units, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the present invention.

The hardware such as the server 20 and the terminal 10 used to implement the various illustrative logics, logical blocks, units, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and Blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mobile communication device comprising:
a voice call management part configured to manage all voice calls on the mobile communication device;
a text message management part configured to manage all text messages exchanged with the mobile communication device through a mobile telephone switching network;
a display part;
an integrated message management unit; and
an additional function process part configured to process at least one additional function in association with the integrated message management unit;
wherein the integrated message management unit comprises:
a message monitoring unit configured to monitor all voice call information and all text message information in association with the voice call management part and the text message management part;
a message information managing unit configured to generate integrated message information, which is to be provided to a user, based on the voice call information and the text message information;
an interface managing unit configured to generate an integrated message management user interface displaying the integrated message information; and
an artificial intelligence agent configured for analyzing the voice call information and the text message information to produce an analyzed result, identifying a service other than generating a voice message or a text message based on the analyzed result, and providing the service by execution of the additional function process part based on the analyzed result, the artificial intelligence agent comprising:
a speech act analysis module configured for performing morpheme analysis and speech act analysis on each text message to determine a purpose of the text message;
a service response generating module configured for searching and providing a service corresponding to the purpose of the text message analyzed by the speech act analysis module; and
a dialog tracking module configured for tracking a neighboring message following the text message, and managing a result of the speech act analysis and process of tracking the neighboring message,
wherein the service response generating module generates schedule information when the speech act analysis module determines that the text message is related to an arrangement,
wherein the service response generating module executes a schedule management application to register the schedule information when the purpose of the text message is notifying that a specific task is done at a specific time, wherein, when the purpose of the text message is determined as presenting a first proposal of a specific task at a specific time, the service response generating module temporarily stores the schedule information of the first proposal, and the dialog tracking module traces morpheme/speech act analysis on messages following the text message in association with the schedule information, and wherein repeating of the tracing morpheme/speech act analysis is limited to N times, wherein N is a natural number.

2. The mobile communication device of claim 1, wherein the service response generating module executes a schedule management application to register the temporarily stored schedule information when a consecutive message is determined as a consent to the first proposal.

3. The mobile communication device of claim 1, wherein, if it is determined that the message following the text message presents an alternative of an entity of the schedule information, the dialog tracking module updates the schedule information based on the alternative, temporarily stores the updated schedule information in a memory, and traces morpheme/speech act analysis on messages following the messages including the alternative in association with the schedule information.

4. The mobile communication device of claim 3, wherein the service response generating module executes a schedule management application to register the temporarily stored schedule information when a message following message including an alternative is determined as a consent to the alternative.

5. The mobile communication device of claim 1, wherein when the purpose of the text message is determined as presenting a first proposal of a specific task without specifying time, the service response generating module temporarily stores the schedule information of the first proposal, and the dialog tracking module traces morpheme/speech act analysis on messages following the text message in association with the schedule information.

6. The mobile communication device of claim 5, wherein when it is determined that a messages following the text message specifies time for the task, the dialog tracking module updates the schedule information based on the specified time, temporarily stores the updated schedule information in a memory, and traces morpheme/speech act analysis on messages following the messages including an alternative in association with the schedule information.

7. The mobile communication device of claim 6, wherein the service response generating module executes a schedule management application to register the temporarily stored schedule information when a message following message specifying time is determined as a consent to the specified time.

8. The mobile communication device of claim 6, wherein, if it is determined that the message following the message specifying time presents an alternative of an entity of the updated schedule information, the dialog tracking module updates the schedule information based on the alternative, temporarily stores the updated schedule information in the memory, and traces morpheme/speech act analysis on messages following the message including the alternative in association with the schedule information.

9. The mobile communication device of claim 8, wherein the service response generating module executes a schedule management application to register the temporarily stored schedule information when a message following message including the alternative is determined as a consent to the alternative.

10. The mobile communication device of claim 1, wherein, if the schedule information does not include a place, the service response generating module searches for a relevant place referring to a task of the schedule information and provides a search result.

11. The mobile communication device of claim 10, wherein the service response generating module performs morpheme analysis and speech act analysis on messages to search for a relevant place.

12. The mobile communication device of claim 10, wherein the service response generating module uses location information of the user and counterpart information to search for a relevant place.

13. The mobile communication device of claim 1, wherein the artificial intelligence agent is further configured to:
receive voice call information of a missed incoming voice call from the voice call management part;
identify the calling party from the received voice call information;
analyze a conversation history of text messages exchanged between the identified calling party and the user to determine a level of tone used for a response;
generate a response message based on the determined level of tone; and
transmit the generated response message to a mobile device of the calling party.

14. A method, performed by an artificial agent of a mobile device of a user, for creating a schedule based on analysis of incoming and outgoing message, the method comprising:
performing a morpheme analysis and a speech act analysis on a conversation comprising messages exchanged between the mobile device and a second mobile device;
determining whether the conversation comprises a first message for arranging a schedule;
extracting entities constituting the schedule from the first message to generate schedule information and temporarily storing the schedule information;
determining whether the first message is a notification of a fixed schedule using a result of the morpheme analysis and speech act analysis; and
registering the schedule information when the first message is determined as a notification of a fixed schedule, and
when the first message is not determined as a notification of a fixed schedule, further comprising:
determining whether the first message is a proposal of a specific task at a specific time;
performing morpheme analysis and speech act analysis on a second message following the first message to determine whether a consent to the first message when the first message is determined as a proposal of a specific task at a specific time;
registering the schedule information when it is determined that the second message include a consent to the first message;
determining whether the second message is a presentation of an alternative for the temporarily stored schedule information;
updating the temporarily stored schedule information based on the alternative when the second message is determined as a presentation of an alternative; and performing morpheme analysis and speech act analysis on messages following the second message to determine whether a consent to the second message, wherein repeating of the morpheme analysis and speech act analysis is limited to N times, wherein N is a natural number.

15. The method of claim 14, wherein the step of registering the schedule information comprises:
executing a schedule management application; and
registering the schedule information into the schedule management application.

16. The method of claim 14, wherein the step of registering the schedule information comprises:
generating a graphical user interface for receiving a user input confirming the generated schedule information;
receiving a user input confirming the generated schedule information through the graphical user interface;
executing a schedule management application; and
registering the schedule information into the schedule management application.

17. The method of claim 14 further comprising:
searching a relevant place referring to task of the schedule information wherein when the schedule information does not include a place to obtain a search result; and
providing the search result to the user.

18. The method of claim 17, wherein the searching a relevant place is performed using morpheme analysis and speech act analysis on messages.

19. The method of claim 17, wherein the searching a relevant place is performed using location information of the user and counterpart information.

* * * * *